(12) United States Patent
de Jong

(10) Patent No.: US 7,232,073 B1
(45) Date of Patent: Jun. 19, 2007

(54) SMART CARD WITH MULTIPLE APPLICATIONS

(75) Inventor: Eduard de Jong, Dyfed (GB)

(73) Assignee: Sun Microsystems, Inc., Santa Clara, CA (US)

( * ) Notice: Subject to any disclaimer, the term of this patent is extended or adjusted under 35 U.S.C. 154(b) by 380 days.

(21) Appl. No.: 11/019,833

(22) Filed: Dec. 21, 2004

(51) Int. Cl.
*G06K 19/00* (2006.01)

(52) U.S. Cl. .................. 235/487; 235/494; 235/382; 711/115; 717/163

(58) Field of Classification Search ............... 235/382, 235/487, 494; 711/115; 717/163
See application file for complete search history.

(56) References Cited

U.S. PATENT DOCUMENTS

| | | | |
|---|---|---|---|
| 5,530,232 A | 6/1996 | Taylor | 235/380 |
| 5,590,038 A | 12/1996 | Pitroda | 395/241 |
| 5,857,079 A | 1/1999 | Claus et al. | 704/33 |
| 5,889,941 A * | 3/1999 | Tushie et al. | 726/26 |
| 6,005,942 A | 12/1999 | Chan et al. | 380/25 |
| 6,024,286 A | 2/2000 | Bradley et al. | 235/492 |
| 6,032,136 A | 2/2000 | Brake, Jr. et al. | 705/41 |
| 6,101,477 A | 8/2000 | Hohle et al. | 705/1 |
| 6,199,762 B1 | 3/2001 | Hohle | 235/492 |
| 6,308,317 B1 | 10/2001 | Wilkinson et al. | 717/5 |
| 6,390,374 B1 | 5/2002 | Carper et al. | 235/492 |
| 6,418,554 B1 | 7/2002 | Delo et al. | 717/11 |
| 6,477,702 B1 | 11/2002 | Yellin et al. | 717/126 |
| 6,481,632 B2 | 11/2002 | Wentker et al. | 235/492 |
| 6,631,849 B2 | 10/2003 | Blossom | 235/492 |
| 6,915,957 B2 | 7/2005 | Kisliakov | 235/492 |
| 6,976,635 B2 | 12/2005 | Ashizawa et al. | 235/492 |
| 2002/0083322 A1 | 6/2002 | Lagosanto et al. | 713/172 |
| 2002/0134843 A1 | 9/2002 | Ashizawa et al. | 235/492 |
| 2003/0078866 A1 | 4/2003 | Richards et al. | 705/35 |
| 2003/0212896 A1 | 11/2003 | Kisliakov | 713/193 |
| 2004/0024735 A1 | 2/2004 | Yap et al. | 707/1 |
| 2004/0255081 A1 | 12/2004 | Arnouse | 711/115 |
| 2005/0038741 A1 | 2/2005 | Bonalle et al. | 705/40 |
| 2005/0091544 A1 | 4/2005 | Lambert | 713/202 |
| 2005/0097550 A1 | 5/2005 | Schwabe et al. | 717/178 |
| 2005/0138354 A1 | 6/2005 | Saltz | 713/153 |
| 2005/0149926 A1 | 7/2005 | Saltz | 718/1 |
| 2005/0178833 A1 * | 8/2005 | Kisliakov | 235/441 |
| 2005/0184163 A1 | 8/2005 | de Jong | 235/492 |
| 2005/0184164 A1 | 8/2005 | de Jong | 235/492 |
| 2005/0188360 A1 | 8/2005 | de Jong | 717/136 |

OTHER PUBLICATIONS

Sun Microsystems, Inc., "Java Card™ 2.2 Runtime Environment (JCRE) Specification", Palo Alto, CA, pp. 1-110, [Online] Jun. 2002. (XP002325473).

Sun Microsystems, Inc., "Java Card™ 2.2 Application Programming Interface", Palo Alto, CA, pp. 1-90, [Online] Sep. 2002. (XP002325474).

(Continued)

*Primary Examiner*—Karl D. Frech
(74) *Attorney, Agent, or Firm*—Gunnison, McKay & Hodgson, L.L.P.; Forrest Gunnison

(57) ABSTRACT

One embodiment of the invention provides a smart card having multiple applications installed thereon. One of the multiple applications is designated as a default application which is activated whenever the card is reset. The default application is required to implement a first operation to provide a canonically ordered listing of the multiple applications on the card. The default application may further implement a second operation to allow one of the multiple applications to be selected for activation via an index into the listing.

69 Claims, 15 Drawing Sheets

OTHER PUBLICATIONS

Sun Microsystems, Inc., "User's Guide, Wireless Toolkit, Version 2.1, Java™ 2 Platform, Micro Edition", Sana Clara, CA, pp. 7-17, 73-75, [Online] Dec. 2003. (XP002325476).

OSS-J Architecture Board, "OSS Through Java™ J2EE Design Guidelines", *OSS Through Java™*, pp. 1-116, [Online] Oct. 31, 2001. (XP002325475).

* cited by examiner

SMART CARD WITH MULTIPLE APPLICATIONS

CROSS-REFERENCE TO RELATED APPLICATIONS

The present application is related to the following applications, all of which were filed on 24 Feb. 2004 and are by the same inventor and assigned to the same assignee as the present application:

"METHOD AND APPARATUS FOR PROVIDING AN APPLICATION IDENTIFIER FOR AN APPLICATION ON A SMART CARD" (Sun P9176—U.S. application Ser. No. 10/786,506);

"METHOD AND APPARATUS FOR INSTALLING AN APPLICATION ONTO A SMART CARD" (Sun 9177—U.S. application Ser. No. 10/786,763);

"METHOD AND APPARATUS FOR SELECTING A DESIRED APPLICATION ON A SMART CARD" (Sun P9178—U.S. application Ser. No. 10/786,895); and "METHOD AND APPARATUS FOR PROCESSING AN APPLICATION IDENTIFIER FROM A SMART CARD" (Sun P9179—U.S. application Ser. No. 10/786,312).

The above-identified applications are all hereby incorporated by reference into the present application.

FIELD OF THE INVENTION

The invention relates to smart card technology, and in particular to smart cards that support multiple applications.

BACKGROUND OF THE INVENTION

Most people now have a collection of small plastic cards, representing various credit cards, store cards, identity cards, membership cards, and so on. Information about the card and its owner, such as account details and so on, is normally printed or embossed on the card, and may also be stored in some form of magnetic strip. Note that such cards are simply passive storage devices, and the information that they contain is fixed at card creation time.

In recent years, smart cards have also proliferated. These are similar in scale to traditional credit cards, but incorporate within their plastic cases a microelectronic memory and also (optionally) an embedded processor. It will be appreciated that the computational resources available within a smart card are extremely limited compared to those of a desktop workstation, or even a laptop or handheld device. One especially popular form of smart card is known as a Java Card. This is based on the Java platform developed by Sun Microsystems ("Java" and "Java Card" are trademarks of Sun Microsystems Inc). In such devices, a Java virtual machine (VM) is provided within the smart card to allow the execution of Java applets or applications. Particular advantages of being able to use the Java environment for smart card applications are the inherent security features of the Java environment, plus the ready availability of software development packages for the Java programming language. It is estimated that by the end of 2002 over 200 million Java cards had been shipped. More information about the Java Card smart card platform is available from the page: /products/javacard/ at the web site: http://java.sun.com and from the site: http://wwwjavacardforum.org/, and also from the book: "Java Card Technology for Smart Cards" by Zhiqun Chen, Addison-Wesley, 2000, ISBN 0-201-70329-7.

An Application Programming Interface (API) is defined for the Java Card platform. Applications written in the Java programming language invoke this API to access the Java Card run-time environment (JRE) and any native services. The Java Card API allows application portability, in that the same application can run on any smart card that supports the API. The Java Card API is compatible with international standards, in particular the ISO/IEC 7816 family of standards.

In the desktop environment, there is a clear distinction between a Java applet and a Java application, in particular the absence of a ma in class from the former. Although there is a similar distinction in the smart card environment, applets for use on a Java card platform are not the same as applets that run on a web browser. Programs that run on smart cards may be referred to as either an application or as an applet (the former term will be used generally herein).

The Java Card platform supports multiple applications on a single card. These applications may be separated by firewalls, in order to ensure that they do not interfere with one another. This is particularly of concern if the various applications are operated by different organisations, whose business relationships with the card holder may be independent of one another.

FIG. 1 is a schematic diagram representing the life cycle of a smart card, which in this particular implementation is a Java Card. The life cycle commences with the manufacture of the card, and the initial loading of the base operating system and the Java Card environment (210). Also at this stage, one or more applications may be preloaded (215). Generally, the base operating system and Java Card environment, and also potentially any preloaded applications, may be stored in ROM on the smart card as part of the manufacturing process.

The card is now ready for issue to a card holder (220), which typically involves an appropriate personalisation process, as well as initialisation of the Java environment, and starting the Java virtual machine on the card. The card holder is thereafter able to use the card (230). Note that if the card was originally issued without any preloaded applications, then the card holder may have to load an application prior to making substantive use of the card. In practice however, this situation is rather uncommon, since usually there is at least one preloaded application in order to motivate issuance of the card in the first place.

During the operational lifetime of the card, further application programs may potentially be installed onto the card (235), for example if the card holder signs up to new accounts or services. Conversely, applications may be removed from the card, perhaps because an account is closed.

The last operation shown in FIG. 1 is where the card is terminated (240). This may occur, for example, because the card has a built-in expiry date or is surrendered by the user (perhaps if the user is moving to a new card issuer, or the card is physically damaged).

FIG. 2 is a high-level schematic diagram illustrating the main architectural components in a typical smart card application. Thus smart card 102 belongs to card holder 101. Note that smart card 102 may be used as a standalone device, or may be incorporated into some larger system such as a mobile phone. Smart card 102 interacts with a terminal 110 by exchanging an application protocol data unit (ADPU) 108. The format for the ADPU is defined by the International Standard ISO/IEC 7816-3 and typically comprises a command header portion and a payload portion.

Terminal 110 may be a handheld device, an adjunct to a desktop workstation, a dedicated card reader (analogous to an ATM) or any other suitable system. Communications between the smart card 102 and the terminal 110 may be by wired connection or by wireless link (e.g. radio or some other electromagnetic signal), depending on the particular devices concerned. Terminal 110 may be under the direct control of an operator 111 (such as for a handheld terminal), or alternatively terminal 110 may be automated (such as for an ATM). In this latter situation, the card holder 101 may operate the terminal 110 himself/herself.

Terminal 110 interacts with a back office 130 over any suitable form of network 120, such as the Internet, a local area network (LAN), a wide area network (WAN), and so on. Back office 130 may comprise multiple systems (not explicitly shown in FIG. 1), such as a web server or portal attached to network 120, perhaps with an application server and/or a database system behind. Note that the terminal 110 may be off-line until activated by a smart card 102, a card holder 101 or a terminal operator 111 to access a back office 130 over network 120.

It will also be appreciated that in some situations, terminal 110 may interact with card 102 without reference to any other system (such as back office 130). For example, terminal 110 might be some form of machine, such as a car or a photocopier, and card 102 might be used to control access to the machine.

In operation, the card holder 101 typically places the card 102 into or adjacent the terminal 110, thereby allowing the two to interact, e.g. to perform a debit operation from the card to purchase some goods. This interaction will generally be referred to herein as a session, and normally involves the exchange of multiple messages between the smart card 102 and the terminal 110.

Associated with each applet on smart card 102 is an Application Identifier (AID). The AID is a byte string up to 16 bytes long, whose format is defined by International Standard ISO/IEC 7816-4:2004. According to this standard, the first 5 bytes or octets of the AID represent the registered application provider identifier (RID) and have a value allocated by ISO or one of its member bodies. The RID indicates the merchant or other entity involved with operating the application, hereinafter referred to as the RID operator. The RID operator is generally responsible for the back office system 130, and is depicted as application/RID operator 131 in FIG. 2. The last 11 bytes of the AID constitute the proprietary application identifier extension (PIX). The PIX is determined by the RID operator 131, and can be used to store a reference number or other information associated with the application.

International standard ISO/IEC 7816-4 defines a procedure, namely the Select command, to allow a terminal to specify and launch a desired application on a smart card; selecting an application determines the start of a session. The processing associated with the Select command is illustrated at a high level in the flowchart of FIG. 2A. The processing starts when the smart card 102 is first inserted into the terminal 110. The terminal detects the insertion of the smart card (162), and in response to such detection activates the smart card (164, 172). This activation generally includes providing power to the smart card and launching a default application on the card. The default application is so-called because it is automatically started when the card is reset, such as on power up. In some implementations, the default application is identified as the applet that was most recently running on the card (prior to the reset). In other implementations, the default application may be a fixed applet.

The terminal now determines an application on the card to launch (165), and sends a corresponding Select command using an ADPU 108 to the smart card (166). The ADPU specifies the AID of the selected application for use in this session. The request from the terminal is received by the smart card (174). The request is handled by an applet selector program that is running on the smart card 102 as part of a card executive layer. The applet selector is responsible for locating the application that matches the AID requested from the terminal, i.e. the application that has the same AID as that specified in the request (176). If a matching application is found, then this application on the smart card is duly launched (177). The smart card now returns to the terminal 110 an indication of whether or not the requested application has been successfully launched (179 and 180). (N.B. This last action is optional within the context of ISO/IEC 7816-4, although it is commonly implemented).

FIG. 2B describes a variation on the processing of FIG. 2A (also in accordance with ISO/IEC 7816-4). The operations in FIG. 2B are the same as described above in relation to FIG. 2A until operation 166, in which the terminal 110 supplies the card with an abbreviated or truncated AID (known as a partial AID). For example, the partial AID may comprise the first ten bytes of an AID. In these circumstances, there may be multiple matches against the partial AID. For example, if two applications have AIDs that have their first ten bytes in common and then differ only in the final six bytes of the AID, they will both match the same partial AID of length 10 bytes (or less). One reason for using a partial AID might be if the terminal 110 wants to identify all applications on the card having a particular RID.

Consequently, at operation 176A (corresponding to operation 176 in FIG. 2A), the smart card identifies one of the potentially multiple matching applications on the card. This application identified at operation 176A represents the first matching application. The (first) matching application (if any) on the smart card is now launched (177), and a response is provided to the terminal (179A, 180) indicating whether or not the partial AID request (176) was successful. If this request was successful, then the response 179A also includes the AID of the application that was launched at operation 177. If this AID corresponds to the application desired by the terminal (183), then session processing continues (185). However, if the launched application as indicated by the received AID is not the desired application, then processing at the terminal loops back to operation 166, whereby another request containing the partial AID is sent by the terminal to the smart card 102.

The smart card now identifies at operation 176A the next application that matches the partial AID, launches this next matched application (177), and returns the full AID for this next matched application (179A). In addition, the previously launched application (i.e. the first application) may be terminated (not shown in FIG. 2B). The terminal again tests at operation 183 to determine whether or not the matching application corresponds to the desired application, and if not, then we proceed once again around the above loop.

The procedure of FIG. 2B therefore terminates either when the desired application on smart card 102 has been launched, thereby allowing the session to continue (185), or there are no more applications on smart card 102 that match the partial AID. In other words, the AIDs for all the matching applications (if any) have already been returned one-by-one at operation 179A, and then rejected at operation 183. In this latter case, the smart card fails to find any further matching applications (i.e. the test of operation 176A is negative), and returns a failure indication to the terminal at operation 179A.

The terminal then detects that no (further) application has been launched on the card (182), and so aborts the session (184).

Note that to support the above processing, the card 102 needs to ensure that it selects a different matching AID each time it loops through operation 176A (otherwise it may return a matching AID that has already been rejected by the terminal). One mechanism to ensure this is for the smart card to maintain a list of those matching AIDs that have already been returned to the terminal at any previous loops through operation 179A. Alternatively, the smart card may recognise some ordering of the AIDs (for example, based on the binary value of an AID). In this latter case, the smart card notes the matching AID sent last time at operation 179A, and for the next loop through operation 176A selects the next matching AID in the imposed ordering.

It has been suggested that a smart card may include a facility to provide a complete list in a canonical order of all the applications installed on the smart card. (This suggestion is described in a submission by the Netherlands to the standards committee JTC1/SC17 of the ISO/IEC). Each application on a smart card is represented in the list by its AID. The list could then to be used in all presentations by the card of its applications, for example as a directory file. It is also contemplated that the canonically ordered AID list could be used in a variation on the Select command as depicted in FIGS. 2A and 2B. In particular, an index to the list could be encoded over one octet, for instance using values 1 to 253, with the applications specified in the order in which they were originally loaded onto the smart card. This would then allow a desired application to be specified for selection by index value (rather than by AID).

According to this proposal, which is especially relevant to a Java Card implementation, three particular applications are distinguished:
(1) a card management application—this performs functions related to the loading, initialization and removal of other applications.
(2) a card holder personal data application—this typically contains data and functions related to the card holder, such as a user profile, a PIN, biometrics, and name and address. These functions and data may be accessible in the card by other applications as appropriate.
(3) the default application—discussed above. (Note that a card that supports multiple modes of communication with terminal 110 may have a different default application associated with each particular mode of communication).

The card management application and the card holder data application are generally preloaded onto a smart card (see operation 215 in FIG. 1).

In the proposal, the three special applications listed above are assigned predetermined index values. In particular, the index value 0 is reserved for the current default application; the index value −2 (254) is reserved for the card holder data application; and the index value −1 (255) is reserved for the card management application. Note that the card holder data application and the card management application will therefore generally appear twice in the list, once at the position in the list that reflects when they were loaded, and once at their reserved location (i.e. −2 and −1 respectively). This submission has not yet been formally adopted by the ISO/IEC.

Most early smart cards were viewed primarily as memory devices. The main purpose of a session involving the card was therefore to read data to or write data from a selected location on the card. The development of Java cards has introduced an application-oriented environment, in which the behaviour of a card is controlled by an application on the card. This has led to the role of a default application as mentioned above to take initial control of a card, pending user selection of a particular desired application. A further submission by the Netherlands to the standards committee JTC1/SC17 of the ISO/IEC has suggested that a default application should firstly be able to provide a list of applications on the smart card and secondly to support selecting an application on the card to run.

Although the Java Card environment supports multiple applications from different RID operators, in practice, a large majority of issued cards originate from and are run by a single RID operator. In other words, applications from one RID operator are typically found on one card, and applications from another RID operator are found on a different card. Moreover, many cards are provided with only a single application. Consequently, relatively little attention has been paid to the handling of smart cards having multiple applications, potentially from a range of different vendors (i.e. from different RID operators).

SUMMARY OF THE INVENTION

In accordance with one embodiment of the invention there is provided a smart card having multiple applications installed thereon. One of the multiple applications is designated as a default application which is activated whenever the card is reset. The default application is required to implement a first operation to provide a canonically ordered listing of the multiple applications on the card. In one particular embodiment, an application may be selected for activation by providing an index into the list in a command header of an application protocol data unit received by the card from a terminal. This therefore enables an application to be selected by index from a list, rather than by AID.

In one particular embodiment, the default application is further required to implement a second operation to allow one of said multiple applications to be selected for activation via an index into said list. In one particular embodiment the default application has a programming interface to implement the first operation, and the second operation if relevant. The programming interface comprises a predetermined set of one or more method calls. The programming interface may comprise at least a first method call for enabling the first operation. The programming interface may further comprise a second method call for enabling the second operation. The programming interface may also comprise a method for notifying an application that it has been designated as the default application, and a method for notifying an application that it has ceased to be the default application.

In one particular embodiment, the list is provided by the default application in response to a request from a terminal, while in another embodiment, the list is provided automatically to a terminal by the default application in response to activation of the default application. In yet another embodiment, the default application is configurable as to whether the list is provided by the default application in response to a request from the terminal or automatically in response to activation of the default application. The default application may have a handler installed to implement the first operation to provide the list.

In one particular embodiment, there is a card executive layer in the smart card, and the default application interacts with the card executive layer in order to implement the first operation and the second operation (if relevant).

In one particular embodiment, the smart card further comprises a card management application, which is responsive to a request to make an application the default application. The request may be made when the application to be made default application is being installed onto the smart card. In one embodiment, the card management application verifies that the application requested to become the default application implements a predetermined interface. In one embodiment, the predetermined interface is defined to support at least the first operation.

Another embodiment of the invention provides a method of operating a smart card having multiple applications installed thereon. The method comprises designating one of the multiple applications as a default application. The default application is required to implement a first operation to provide a canonically ordered list of said multiple applications on the card. The default application is activated whenever the card is reset.

Another embodiment of the invention provides a method of designating an application on a smart card as a default application. The method comprises receiving a request to designate an application as a default application on the smart card; confirming that the default application implements a first operation to provide a canonically ordered listing of multiple applications on the card; and designating the requested application as the default application, subject to a positive outcome from the confirming.

Other embodiments of the invention provide data structures, computer programs and computer program products for implementing such methods. The computer programs and methods of the invention will generally benefit from the same particular features as the smart card embodiments of the invention.

BRIEF DESCRIPTION OF THE DRAWINGS

Various embodiments of the invention will now be described in detail by way of example only with reference to the following drawings:

FIG. 6 B illustrates an AID listing in accordance with another embodiment of the invention.

DETAILED DESCRIPTION

Figure 3:
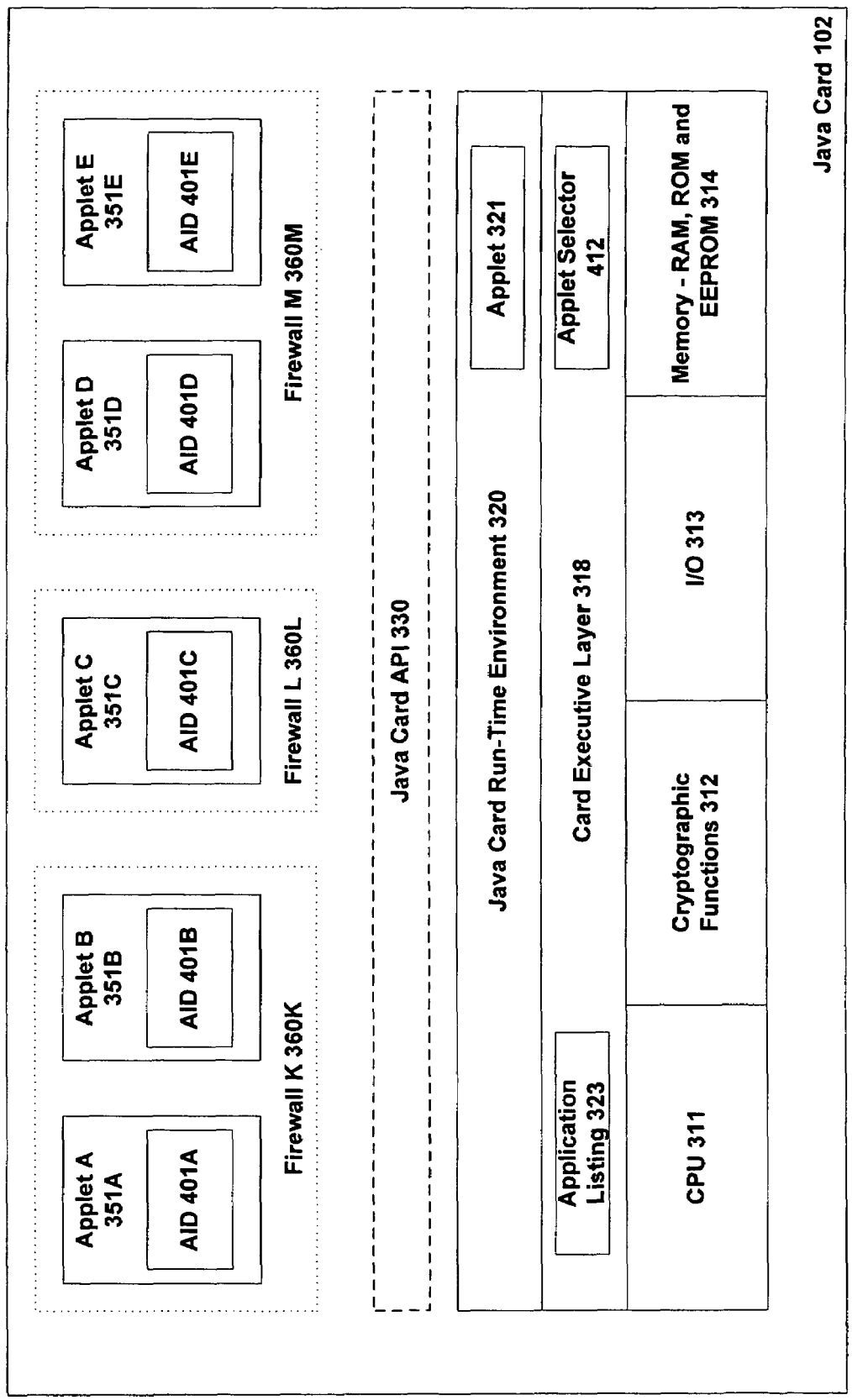
FIG. 3 is a schematic block diagram representing at a high level the structure of a smart card in accordance with one embodiment of the present invention.

FIG. 3 illustrates in schematic form the high level structure of a smart card 102 in accordance with one embodiment of the present invention. (In the particular embodiment shown, the smart card is implemented by a Java Card, although other platforms may be used instead).

Smart card 102 can be regarded as having a layered structure, with hardware at the bottom. The hardware for card 102 includes a CPU 311, a cryptographic facility 312, an input/output unit 313 and memory (RAM, ROM, EEPROM) 314. Running on the hardware platform is a card executive layer 318, usually an operating system (OS) particular to the specific hardware platform involved. The card executive layer includes an applet selector 412 and an application listing 323, as described in more detail below.

On top of the card executive layer is the Java Card runtime environment (JCRE), which includes the Java Card virtual machine (VM) 320. Note that the Java Card VM itself is generally specific to the particular card executive layer 318, but then presents the standard Java Card API 330 to application software 351 running on the smart card 102.

The Java Card device 102 depicted in FIG. 3 has (by way of example) five loaded applets 351A, 351B, 351C, 351D and 351E. Each applet 351 includes a corresponding AID 401A, 401B, 401C, 401D, and 401E. The applets 351A, 351B, 351C, 351D and 351E generally extend (i.e. subclass) a base applet class 321 provided by the JCRE 320. Note that applets 351A, 351B, 351C, 351D and 351E may be from different vendors. Having multiple applications from different vendors installed on a single card avoids a user having to carry around more than one card (one for each vendor or application provider).

The applets 351 are arranged into three groups, separated from another by firewalls 360. Thus applets 351A and 351B are in firewall 360K, applet 351C is in firewall 360L, and applets 351D and 351E are in firewall 360M. Applets 351 can share data within a firewall 360, but not generally from one firewall to another. One common motivation for having two or more applets within a single firewall is where one applet manages the code and classes of the other application(s) that are within the same firewall. It is expected that all the applets within a particular firewall are controlled by the same RID operator (i.e. they have the same RID).

It will be appreciated that applets 351 are static, in that all the code they use is already stored in smart card 102. In other words, applications do not download any code from terminal 110 or elsewhere except during initial applet installation, at which time all the applet code is loaded for storage onto smart card 102 as part of the applet installation process.

Figure 4:
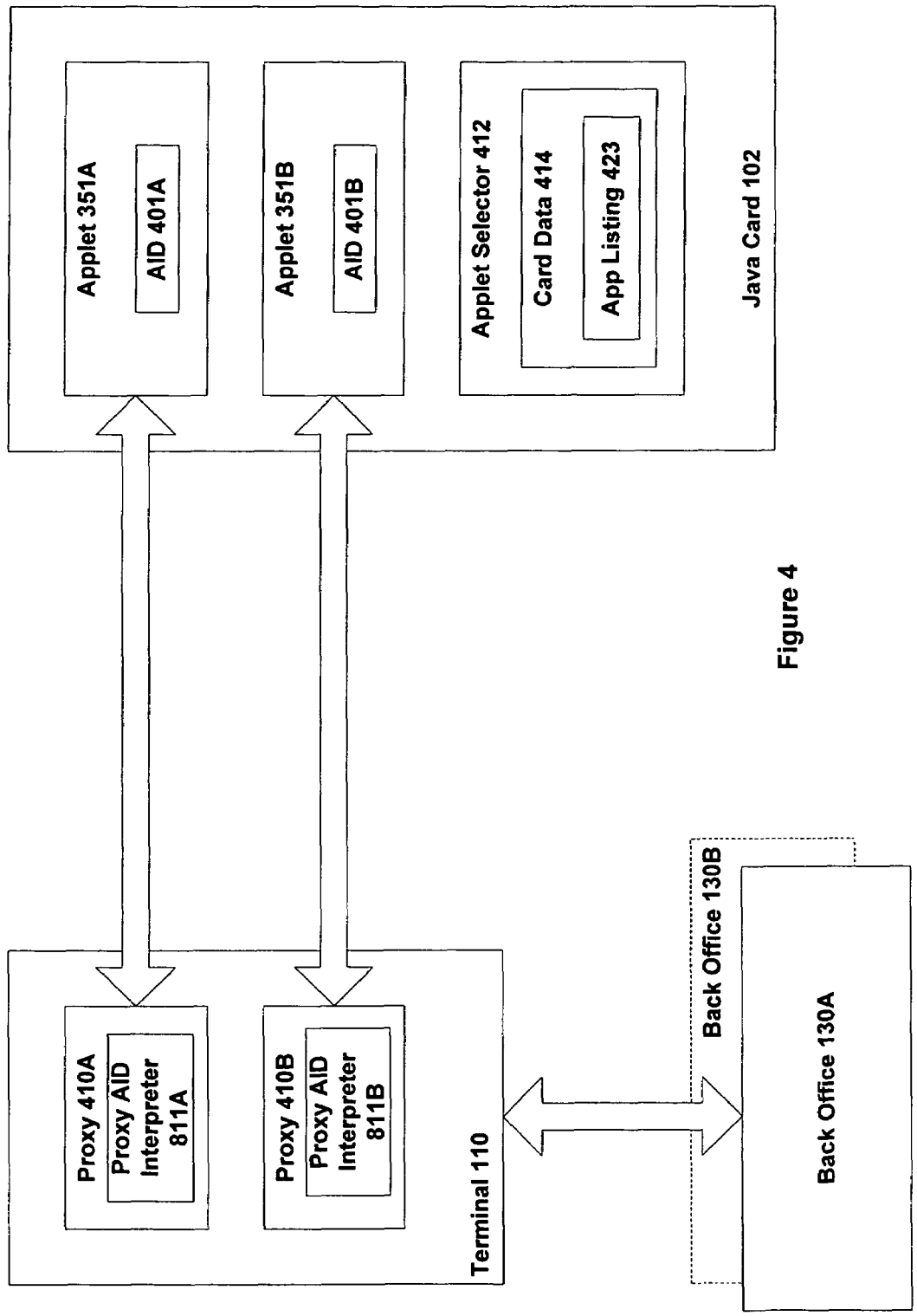
FIG. 4 is a schematic diagram illustrating the interaction between a smart card and a terminal in accordance with one embodiment of the invention.

FIG. 4 depicts in schematic form the interaction between a smart card 102 and a terminal 110. Smart card 102 includes multiple applets, 351A, 351B, etc., each incorporating its own respective AID 401A, 401B, etc. During a session, smart card 102 interacts with terminal 110, which contains one or more proxies 410A, 410B. For each proxy, there is typically a corresponding back office application 130A, 130B. Note that in FIG. 4, there is a one-to-one correspondence between a proxy 410 in the terminal 110 and an applet 351 on smart card 102, although in other embodiments one proxy 410 may be associated with multiple applets 351. Each proxy includes its own proxy AID interpreter 811, which will be described in more detail below. If there is only a single proxy 410 installed on terminal 110, this may be set to trigger automatically when a card 102 is inserted into the terminal 110 (or otherwise engages with the terminal). Note that a proxy 410 need not be terminated after each session with a card, but rather may only be suspended pending insertion of a new (potentially different) card. This helps to reduce proxy start-up time for each new card interacting with terminal 110.

Figure 5:
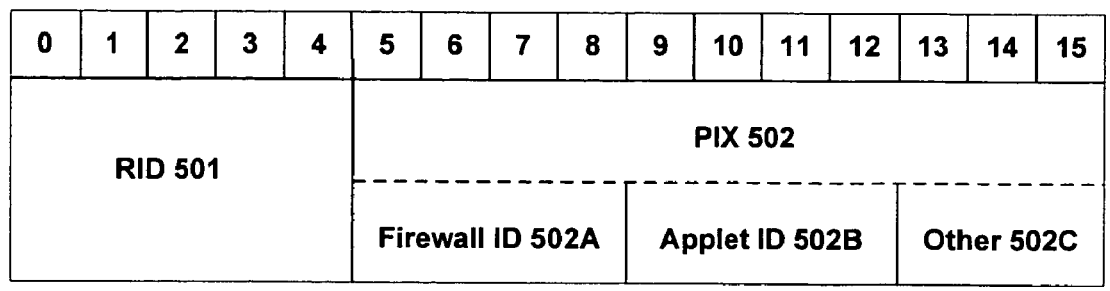
FIG. 5 illustrates the composition of an AID in accordance with one embodiment of the invention.

FIG. 5 illustrates the structure of an AID 401 in terms of a byte string. As previously described, an AID 401 is divided into two portions in accordance with the international standard ISO/IEC 7816-4:2004. In particular, the AID commences with a 5-byte RID portion 501 that identifies the supplier or operator of the applet 351 (i.e. the RID operator), and then has an 11-byte (maximum) proprietary application identifier extension (PIX) portion 502, whose format and content are under the control of the RID operator identified by the RID.

FIG. 5 further illustrates various subfields within the PIX portion 502 of the AID 401 in accordance with one embodiment of the present invention. Thus the PIX portion 502 is used to store an identifier 502A of the firewall 360 that contains the relevant applet, and also an identifier 502B of the applet 351 itself. Additional information 502C may be encoded into the PIX, including dynamic data, such as a current balance remaining on the card.

It will be appreciated that in contrast to the high-level breakdown of the AID 401 into RID and PIX portions, which is specified by the ISO7816-4:2004 standard, there is no such standardisation of the subfields within the PIX portion 502. Accordingly, the sizes and layout shown in FIG. 5 for the Firewall ID portion 502A, the Applet ID portion 502B, and the Other portion 502C are illustrative only, and may vary from one applet to another. For example, in one embodiment the bytes allocated to a particular subfield may not be contiguous. Furthermore, one or more of these subfields may be omitted altogether if not required by a particular RID operator. All such variations are of course constrained by total size of the PIX 502, which is limited to 11 bytes (or at least no greater than 11 bytes), in conformity with the international ISO/IEC standard.

Further information about the structure of an AID 401 may be found in the above-referenced applications "METHOD AND APPARATUS FOR PROVIDING AN APPLICATION IDENTIFIER FOR AN APPLICATION ON A SMART CARD" (Sun P9176—U.S. application Ser. No. 10/786,763) and "METHOD AND APPARATUS FOR SELECTING A DESIRED APPLICATION ON A SMART CARD" (Sun P9178—U.S. application Ser. No. 10/786, 895).

Figure 6:
FIG. 6 illustrates an AID listing in accordance with one embodiment of the invention.

FIG. 6 illustrates the structure of the application listing 323 in more detail in accordance with one embodiment of the invention. In this particular embodiment, listing 323 is structured as a two-dimensional array. Each row in the array corresponds to an application on smart card 102. The first field in each row contains the AID 401A, 401B, 401C, 401D, and 401E for the application, while the second field contains an associated flag to indicate whether the application has any special role. Thus the application having AID 401A is indicated as being the card holder data application 602, application 401C is indicated as being the default application 601, and application 401E is indicated as being the card management application 603.

Note that as previously mentioned, it is possible to have different default applications for different modes of communication with the terminal, such as USB, wireless, and so on. In this case, different applications may be indicated as the default application, along with an indication of the particular communication mode for which the application in question has this role.

Each application in the listing 323 is assigned an index value corresponding to its position in the array. For example, the application having AID 401A can be assigned an index value of 1, the application having AID 401B can be assigned an index value of 2, and so on. In one embodiment, the ordering of the applications in the listing matches the order in which the applications were installed onto card 102, with any new application being appended to the vacant slot immediately below the most recently entered application (i.e. having the lowest available index number). Thus in the example of FIG. 6, the next installed application would be allocated to the index number 6, immediately underneath the application having AID 401E.

Figure 6A:
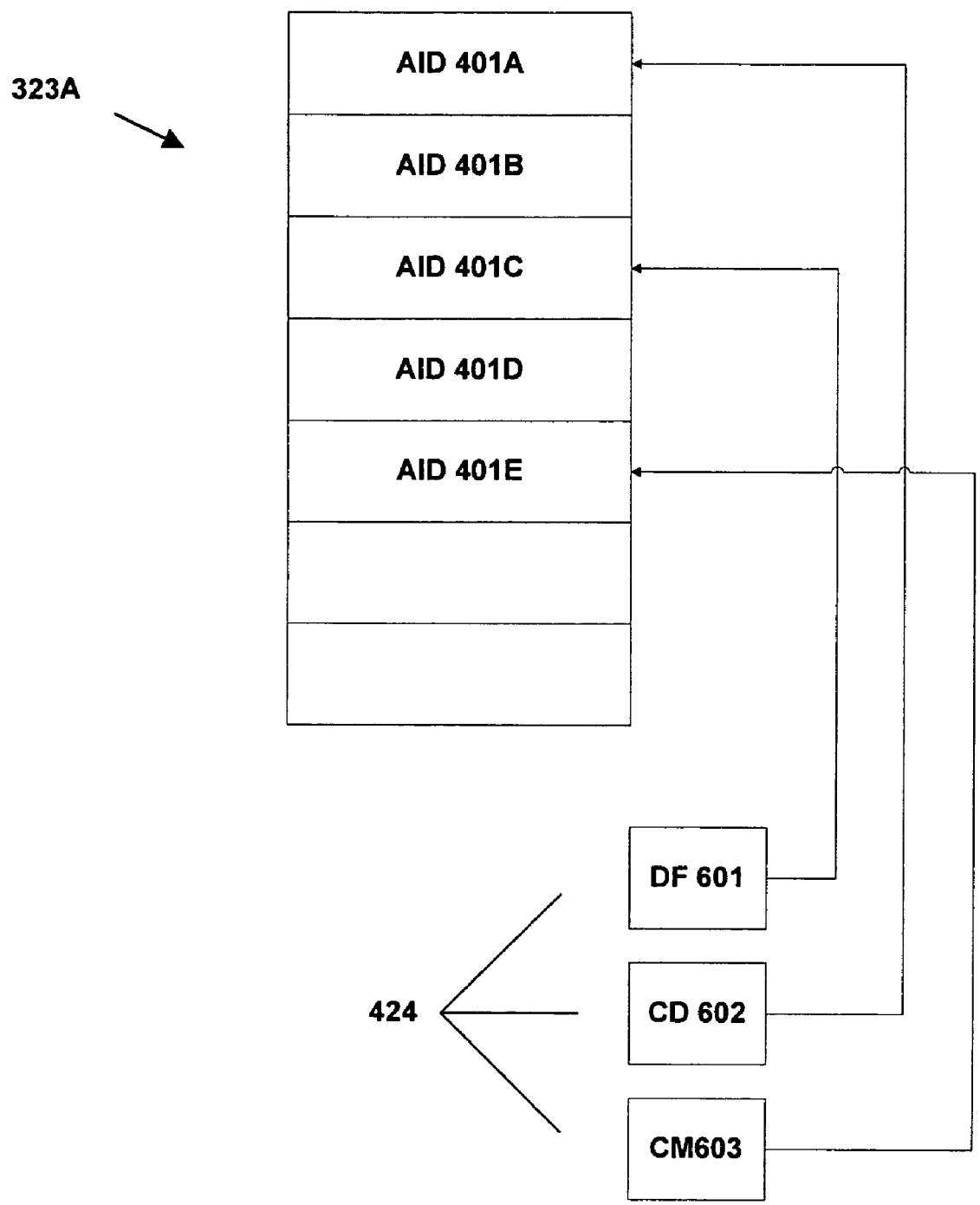
FIG. 6A illustrates an AID listing in accordance with another embodiment of the invention.

It will be appreciated that there are many alternative structures for the application listing 323A. One such alternative structure is shown in FIG. 6A. Here the AIDs 401A, 401B, 401C, 401D, 401E are stored in a single column listing (i.e. a one-dimensional array or vector). Associated with this listing are three pointers, 424, one to indicate the position of the default application 601, one to indicate the position of the card holder data application 602, and one to indicate the position of the card management application 603. The particular allocation of these roles in FIG. 6A is the same as in FIG. 6, namely AID 401A corresponds to card holder data application 602, AID 401C corresponds to default application 601, and AID 401E corresponds to card management application 603.

In one implementation, pointers 424 are one-byte pointers. This permits listing 323A to hold a maximum of 253 different applications (since three positions in the listing are reserved for a special purpose, as described in more detail below).

Figure 6B:
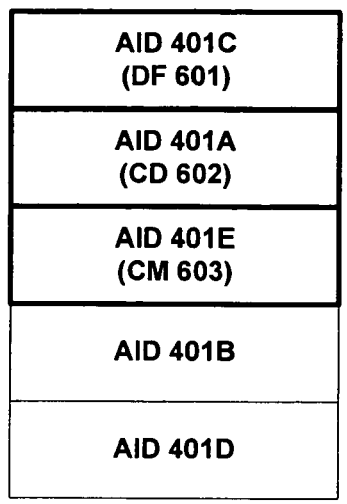

Another possible implementation is shown in FIG. 6B. This embodiment dispenses with pointers 424 from FIG. 6A, but rather has reserved slots for specific application roles. This is illustrated in FIG. 6B, where (for example) the first slot in the vector is reserved for the default application (DF 601), the second slot is reserved for the card holder application (CD 602), and the third slot is reserved for the card management application (CM 603). (These slots are shown in bold in FIG. 6B to indicate their reserved status). The remaining AIDs are then listed in the non-reserved slots.

Figure 1:
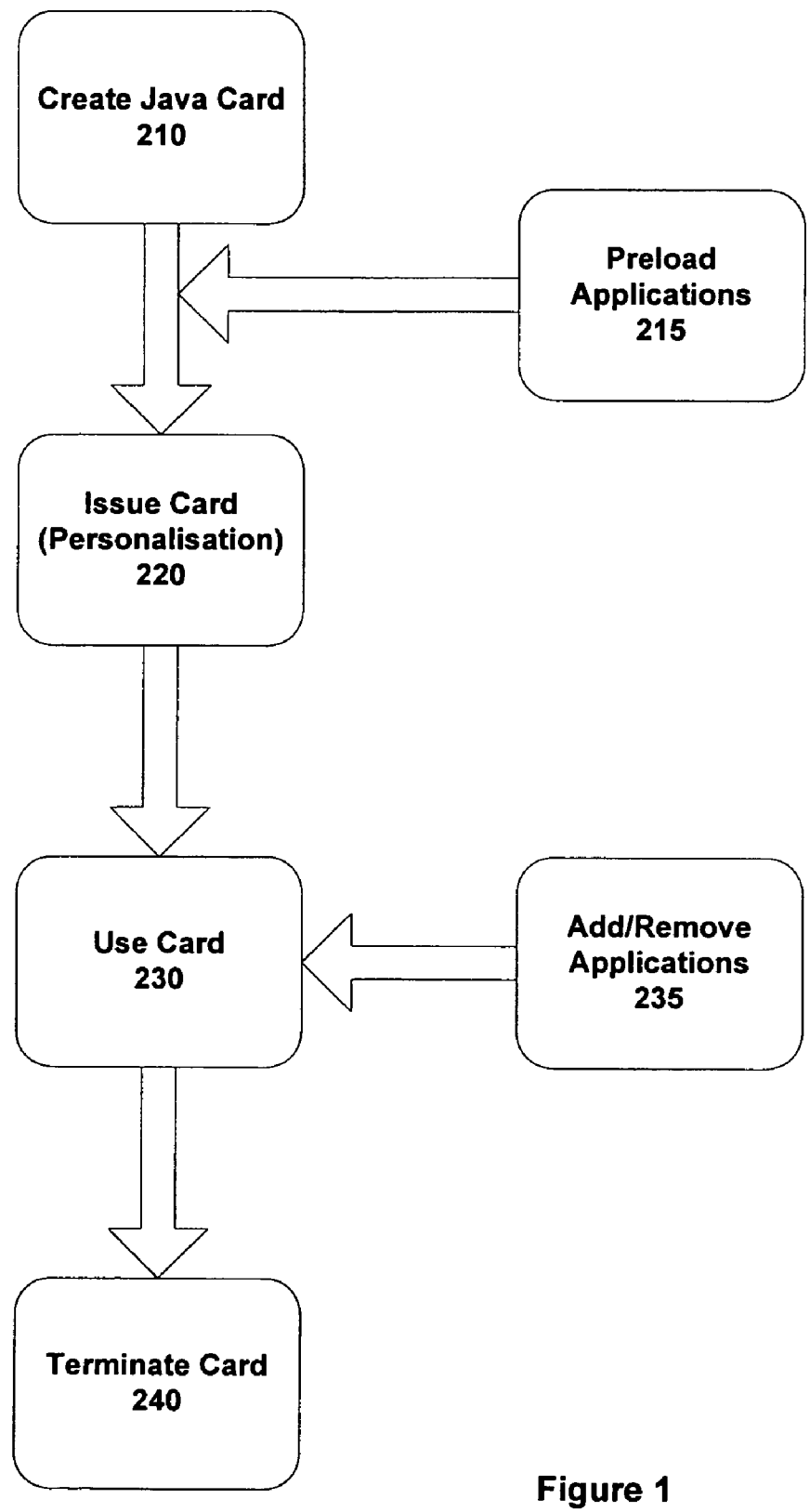
FIG. 1 is a schematic diagram illustrating the typical life cycle of a smart card.

In some circumstances, a smart card may only have one or two applications installed upon it. In this case, it is clear that the roles of default application, card holder data application, and card management application cannot all be taken by different applications. In accordance with one embodiment of the invention, if there are less than three applications on a card, then certain assumptions may be made about their various roles. If these assumptions are standardised across all terminals and cards, they allow the behaviour of a card to be predicted, even if the number of applications on the card is small. Thus if there is only a single application on the card, this is assumed to play the role of both card management application and also default application. If there are two applications on the card, it is assumed that one of them is the card management application. The other application (which might be a card holder data application) is then assumed to be the default application. Note that these assumptions are particularly appropriate to Java cards and other smart cards intended for dynamic operation—i.e. where applications may be added or removed during the lifetime of the card (as per operation 235 of FIG. 1). In contrast, static cards, which have a predetermined set of applications preloaded prior to issuance (i.e. at operation 215 in FIG. 1) that then remain throughout the lifetime of the card may well dispense with the role of the card management application.

As discussed above, it has been proposed for a smart card to support the provision of a canonically ordered list of applications present on the card, which then allows the applications to be accessed by their corresponding one-byte index value. Index values 1–253 are assigned to the various applications on the card in the order in which the applications were originally loaded onto the card. The default application, the card holder data application and the card management application are assigned particular index values, namely 0 for the default application, −1 for the card management application, and −2 for the card holder data application.

It will be appreciated that the data structures of FIG. 6, FIG. 6A, and FIG. 6B readily support the generation and provision of such a canonically ordered AID list. For example, with regard to FIG. 6, as each new application is loaded onto smart card 102, its AID 401 can be added to the next vacant slot in the listing 323. This then provides the backbone of the canonically ordered AID list, with the predetermined index values being supported via the second column of the table in FIG. 6. Accordingly, the list can be implemented for example in a Java environment as a Java programming object wrapped around data structure 323. In one embodiment, such an object supports methods to return the complete AID listing, the AID corresponding to a particular index number, and the index number corresponding to a particular AID.

In other embodiments, the canonically ordered AID list may be supported without storing an AID listing 323 itself (or only storing a portion of it). For example, in such embodiments, the system could generate the AID list dynamically in response to a specific enquiry. This can be achieved by asking each application on the card in turn for its AID. One advantage of this approach is to support dynamic data within an AID, as described in more detail in the above-referenced "METHOD AND APPARATUS FOR PROVIDING AN APPLICATION IDENTIFIER FOR AN APPLICATION ON A SMART CARD" (Sun P9176—U.S. application Ser. No. 10/786,763).

The various applications might also be able to provide their install date (to support ordering of the list) and an indication of any special role assigned to them (e.g. default application, card management application, and so on). Alternatively, at least some of this latter information (install date and/or assigned role) may be maintained centrally by the card executive layer.

Figure 2:
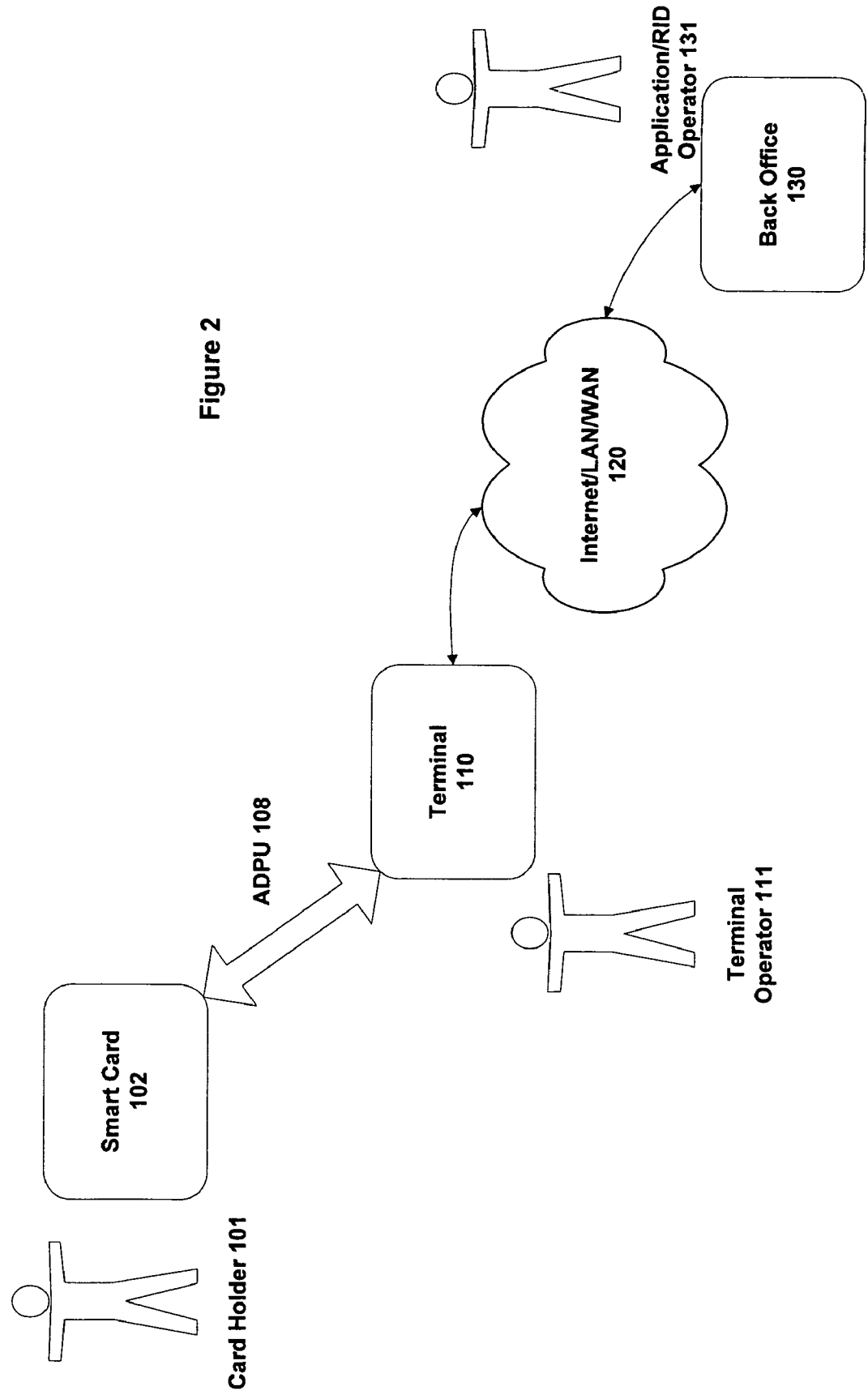
FIG. 2 is a schematic diagram illustrating the main components involved in a typical smart card application.
Figure 2A:
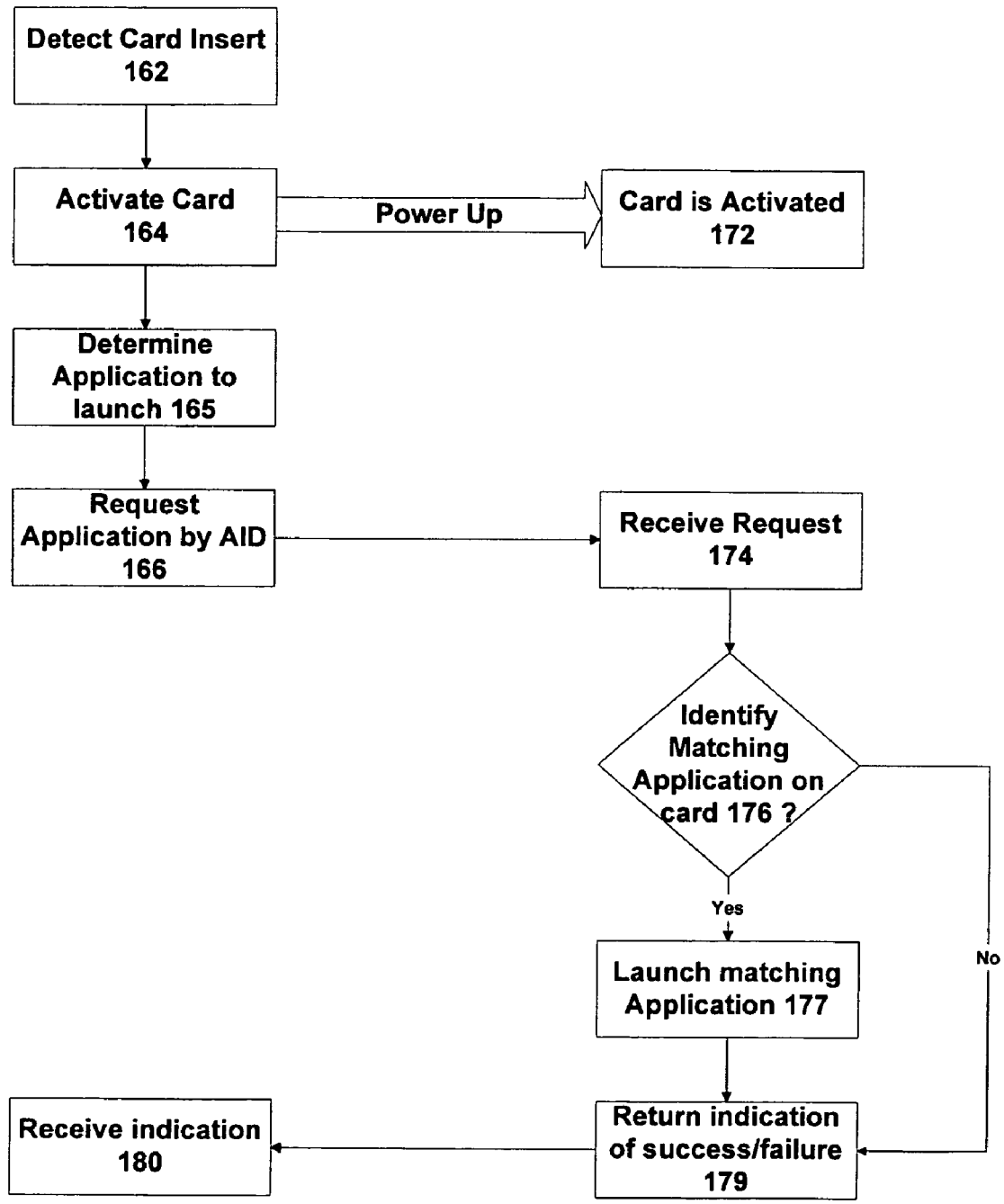
FIG. 2A is a flowchart whereby a terminal selects and launches an application out of potentially multiple applications on a smart card by providing a full AID to the smart card.
Figure 2B:
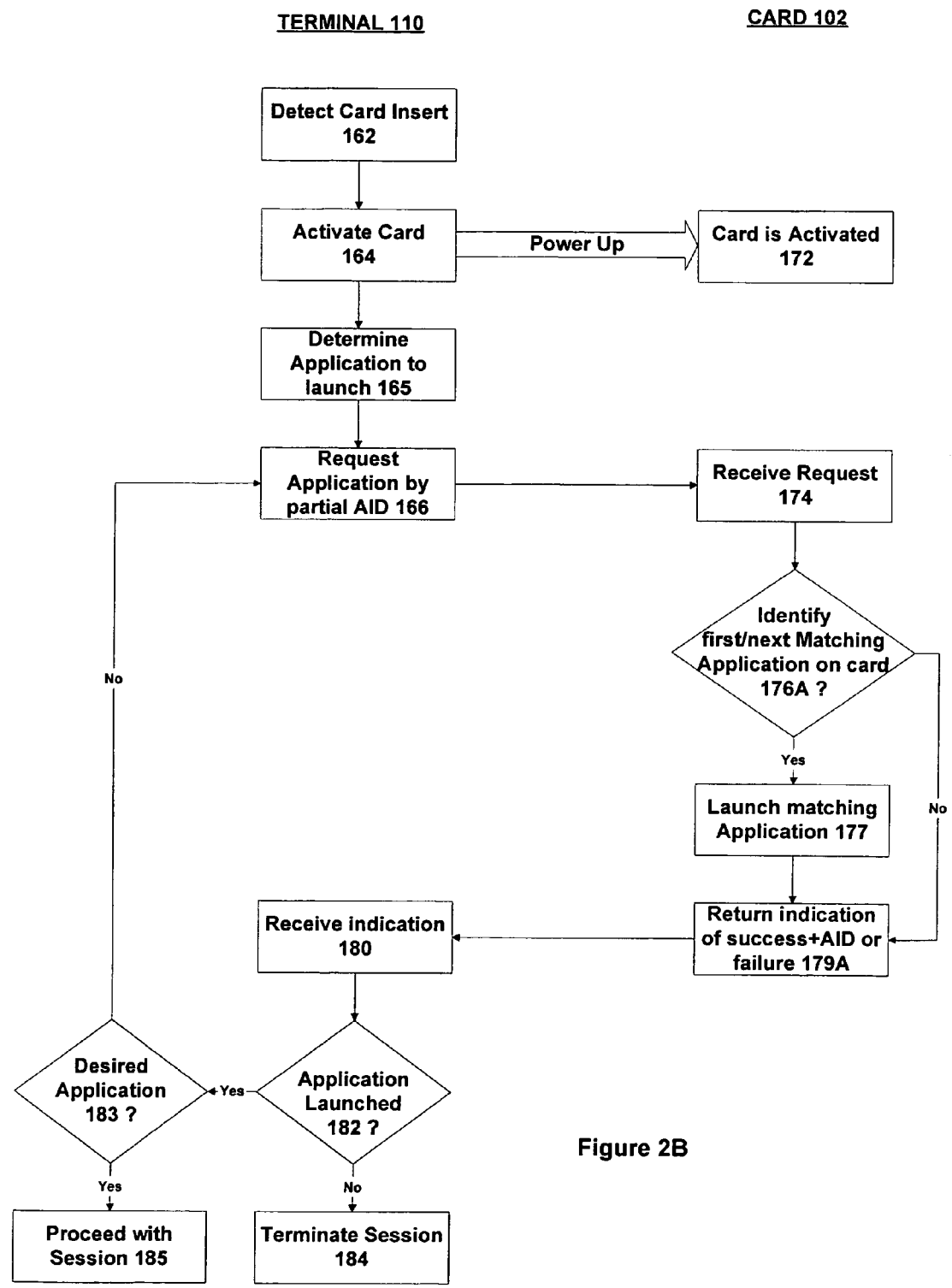
FIG. 2B is a flowchart whereby a terminal selects and launches an application out of potentially multiple applications on a smart card using partial AID matching.
Figure 7:
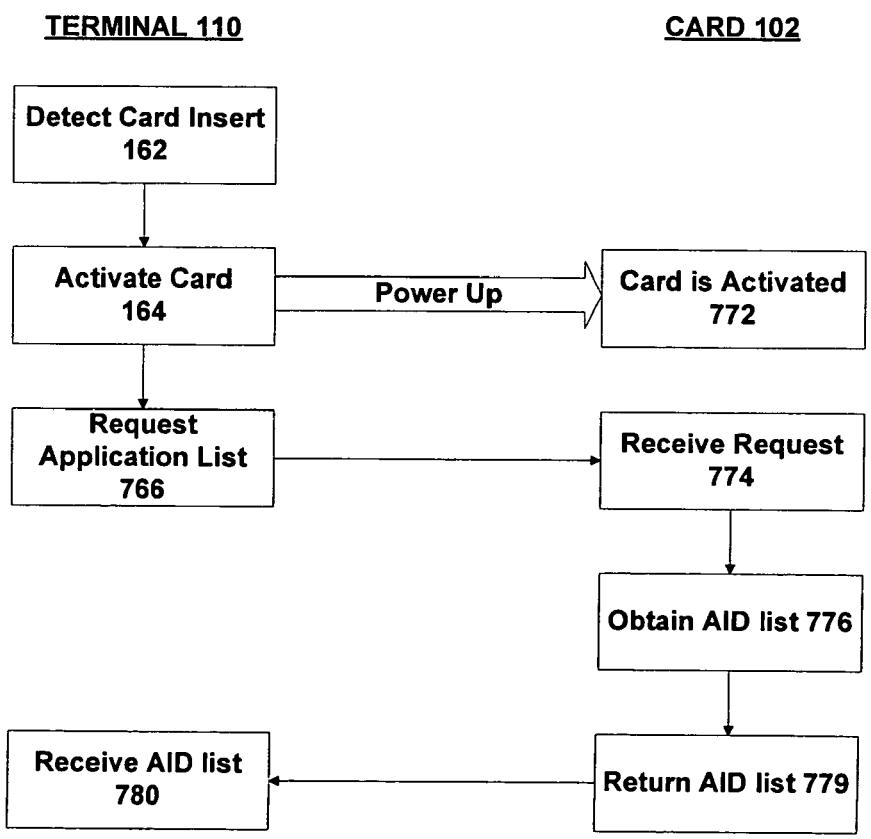
FIG. 7 illustrates the provision of a canonically ordered AID list from the card to the terminal in accordance with one embodiment of the invention.

One possible use of the canonically ordered application list is in a variation of the Select command (i.e. the command sent by a terminal 110 to a card 102 to specify the desired application to be used in a session). Thus the conventional implementation of the Select command, as illustrated in FIG. 2A, involves the card 102 receiving an AID to be matched from terminal 110. FIG. 7 is a flowchart illustrating a different approach for performing application selection in accordance with one embodiment of the invention.

The processing of FIG. 7 starts in the same way as that of FIG. 2A, with the terminal 110 detecting that a card has been inserted (162). This leads to a communication to activate the card (164), and results in power up of the card (772). However, now, rather than the terminal requesting a specific application by AID, instead the terminal sends a request to the card for a complete application list (766).

The request is duly received by the card (774) and passed to the default application, which is responsible for handling incoming communications at this stage. The default application generates or otherwise obtains the canonically ordered AID list (776), which is then returned to the terminal (779, 180). The use made by the terminal of the AID list is discussed in more detail below.

Figure 7A:
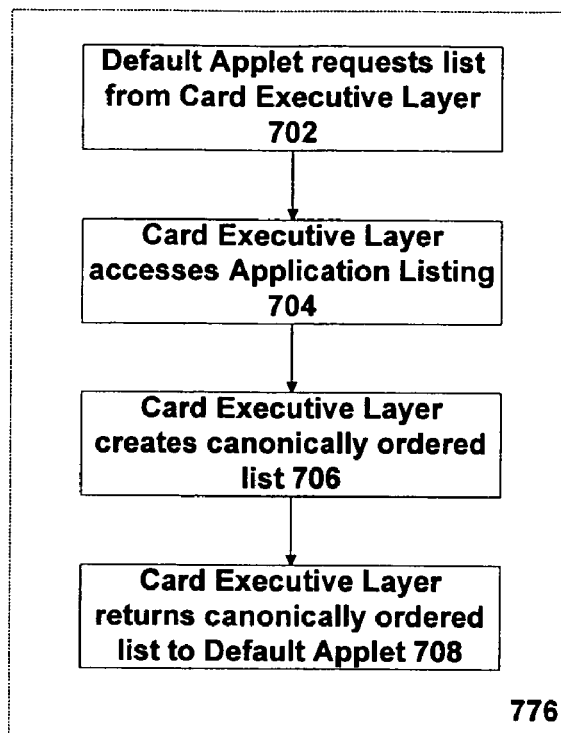
FIG. 7A illustrates a default application acquiring the canonically ordered AID list in accordance with one embodiment of the invention.

FIG. 7A illustrates in more detail the actions underlying operation 776 (acquiring the canonically ordered AID list) in accordance with one embodiment of the invention. Processing begins with the default application responding to incoming request 774 (see FIG. 7) by making a request to the card executive layer for the AID list (704). In one embodiment, a special component of the card executive layer, such as the applet selector 412, is responsible for receiving and handling this request from the default application.

The card executive layer responds to the request from the default application by accessing the stored AID listing 323 (704). The card executive layer now utilises the information from the AID listing to create the canonically ordered application list in the format expected by the default application (706). (Note that in some embodiments, the AID listing 323 may in fact be directly usable as the canonically ordered application list, without further modification). The canonically ordered application list obtained by the card executive layer is then returned to the default application (708), which forwards the list to the terminal (779, 780, as shown in FIG. 7).

As previously mentioned, in some embodiments, the canonically ordered list may be created dynamically rather than being derived from a stored listing 323 (which may not exist in card 102). In this case, operation 704 in FIG. 7A is omitted, and the list is generated at operation 706 as appropriate. For example, in operation 706 the card executive layer may contact each application on the card in turn to obtain the information needed to create the canonically ordered application list. In other embodiments, a combination of approaches can be used, whereby the application list is built up in part from data in a stored structure, such as listing 323, and also in part from data obtained dynamically from individual applications. Note also that the card executive layer may store the generated AID list for future use during the session. Alternatively, the card executive layer may discard the AID list after returning it to the default application, and regenerate the AID list (at least in part) for each new request. One advantage of this latter approach is that it allows for the possibility of dynamic data incorporated into the AID, which might possibly get updated during a session.

Figure 7B:
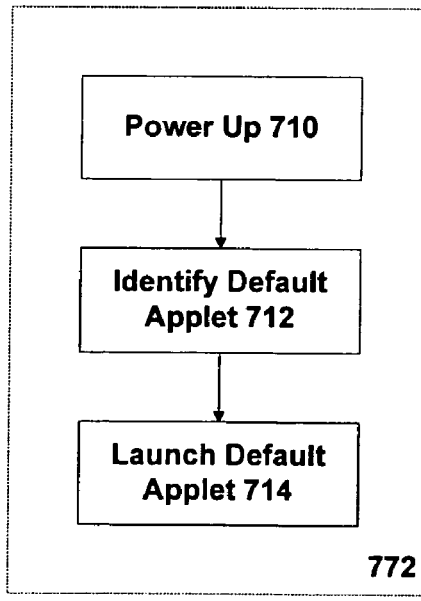
FIG. 7B illustrates the power-up of the card in accordance with one embodiment of the invention.

FIG. 7B illustrates the processing associated with card activation 772 (see FIG. 7) in accordance with one embodiment of the invention. Processing commences with initial power up of the card 102 (710). The card executive layer now identifies the default application (712). There are various ways in which this might be achieved. For example, the card executive layer might access listing 323 or use pointer 601 in FIG. 6A. Alternatively, some other separate (persistent) record of the default application may be maintained on the card, associated either with a particular application, or with the card executive layer. The identified default application is now launched (step 714), so as to be ready to receive and to respond to communications from the terminal 110.

Figure 7C:
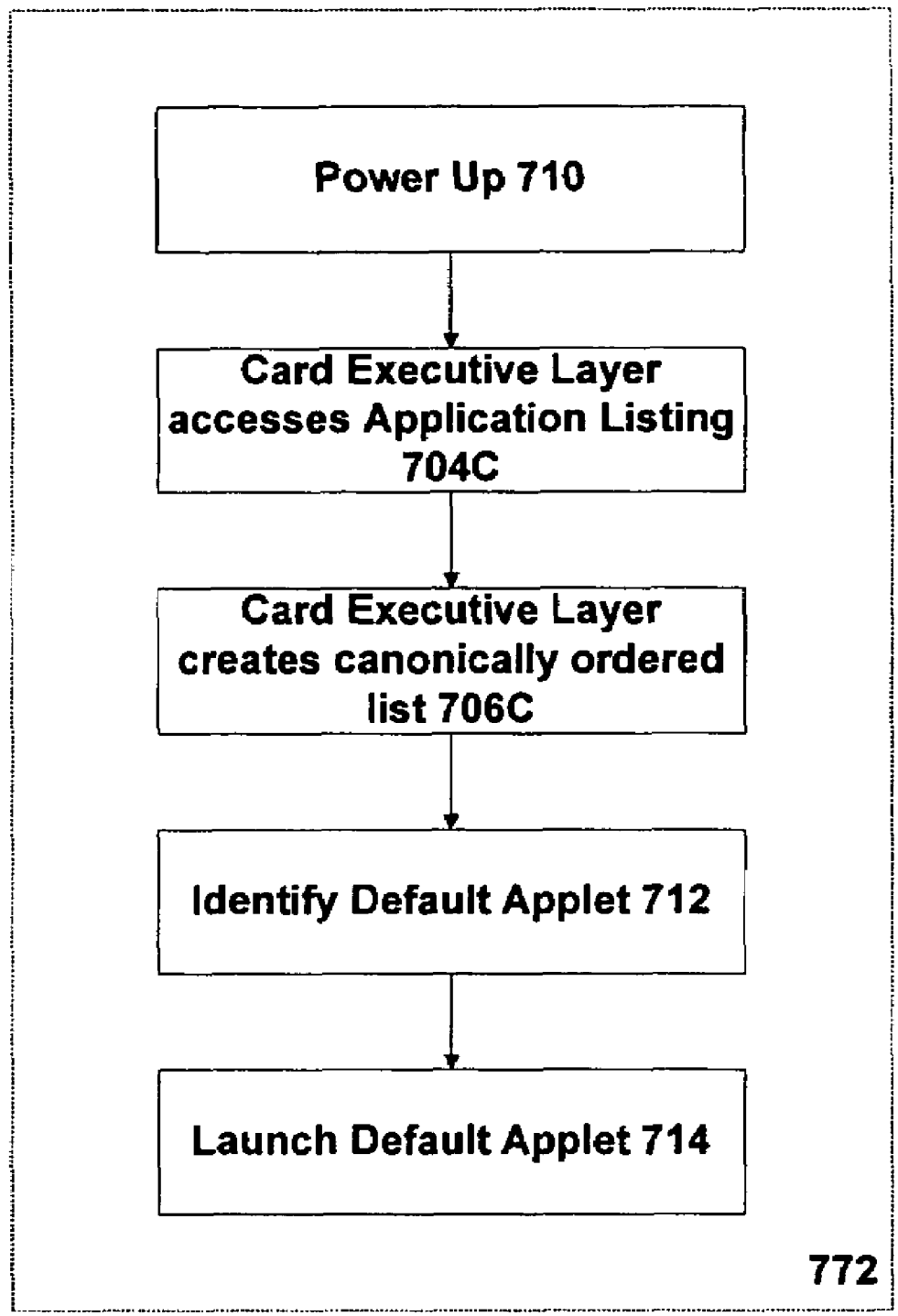
FIG. 7C illustrates the generation of the canonically ordered AID list in response to power-up of the card in accordance with one embodiment of the invention.

FIG. 7C illustrates the processing associated with card activation 772 (see FIG. 7) in accordance with one embodiment of the invention. In this embodiment, the generation of the canonically ordered application list is included as part of card activation, rather than in response to a request from the default application. In particular, operations 704 and 706 from FIG. 7A (labelled as 704C and 706C in FIG. 7C) can be regarded as performed up front in FIG. 7C as part of the activation process (772), rather than in response to a request from the default application (operation 702 in FIG. 7A). This then allows the card executive layer to provide the list straight back to the default application when requested to do so, without having to first obtain or create the list (i.e. operation 708 in FIG. 7A can immediately follow operation 702). Such an approach is particularly beneficial in embodiments where the card executive layer has to access application listing 323 anyway during the activation procedure in order to identify the default application (corresponding to step 712), since listing 323 can then also be used at the same time to create the canonically order application list.

Note that while FIGS. 7A and 7C show the canonically ordered application list being created as part of steps 776 and 772 respectively (see FIG. 7), in other embodiments the list may be created at some appropriate time between these two operations. This would then still ensure that the list is available for provisioning to the default application upon request (i.e. following operation 702, see FIG. 7A). Note also that in some embodiments, the card executive layer may save the canonically ordered application list created at operation 706 (or 706C) for future use if required later during the session with terminal 110. Alternatively, in other embodiments the canonically ordered AID list may be (re)generated as and when necessary during the session (especially if the list contains dynamic data).

Figure 7D:
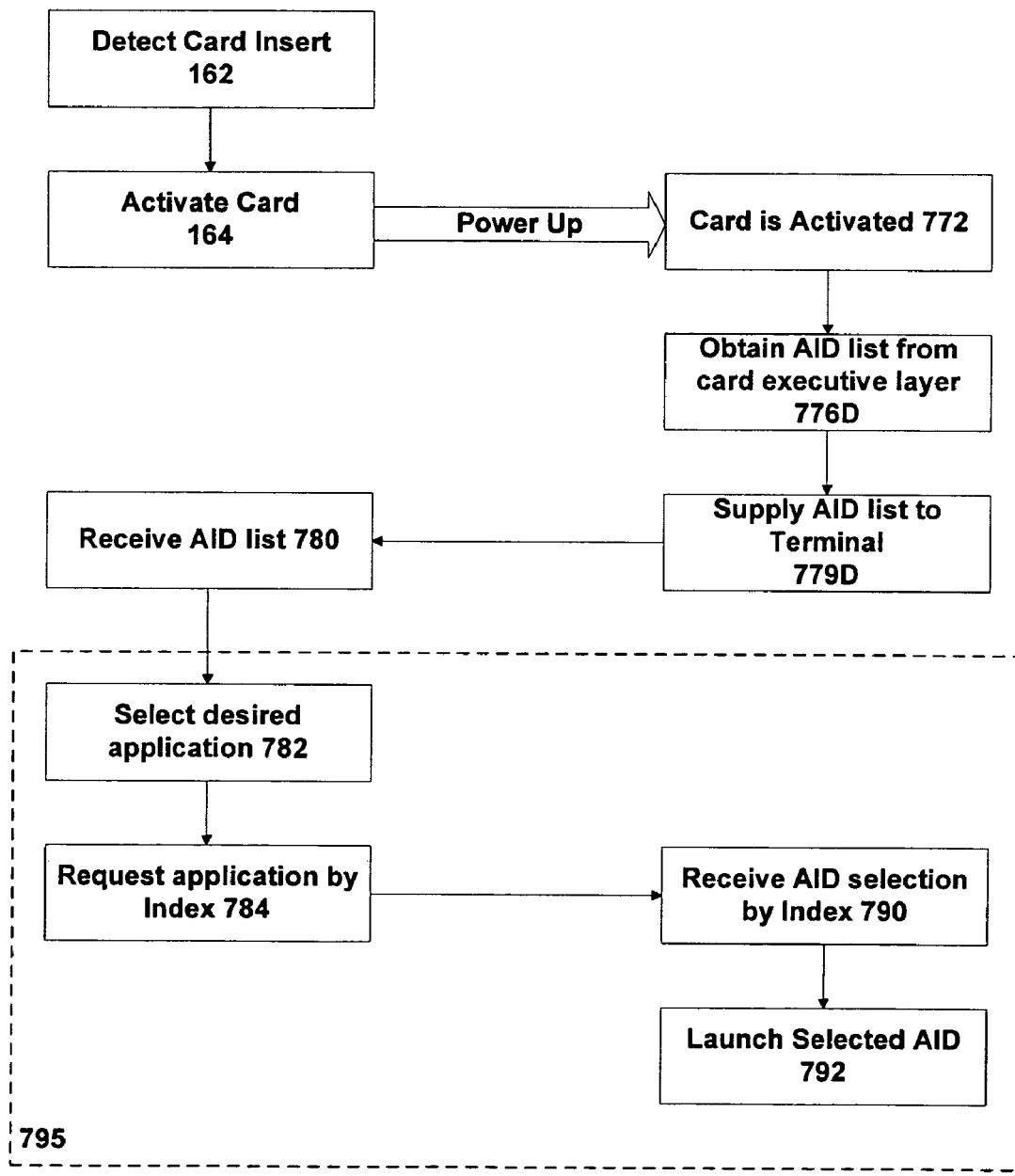
FIG. 7D illustrates the provision of a canonically ordered AID list from the card to the terminal in accordance with one embodiment of the invention.

FIG. 7D is a modification of the processing of FIG. 7, in which the default application automatically supplies the terminal with the generated AID list at start-up, in accordance with one embodiment of the invention. Thus following (or as part of) activation (772), the default application obtains the canonically order AID list from the card executive layer (776D) and provides it to the terminal (779D). The canonically ordered AID list is therefore provided automatically by the default application at start-up to the terminal, without waiting for a specific request.

Note that operations 772 and 776D in FIG. 7D can be implemented as discussed above in relation to FIGS. 7A, 7B, and 7C. Thus in one embodiment the card activation (772) includes identification and launch of the default application (712, 714), while obtaining the canonically ordered AID list (776D) includes the default application sending a request to the card executive layer and receiving the list back from the card executive layer (702, 708). The generation of the canonically ordered AID list by the card executive layer (704, 706) can be performed as part of operation 772 and/or operation 776D, as previously discussed.

In one embodiment, the card executive layer generates the canonically ordered AID list at an early stage of card activation, and passes the list to the default application as a launch parameter for the default application (i.e. as part of operation 714). Alternatively, the default application may subsequently make a specific request for the list from the card executive layer.

In some embodiments, the card has a configurable property of whether to send the AID list automatically after a reset, as in FIG. 7D, or whether to wait until a specific request has been received from the terminal, as in FIG. 7. Another possibility is that the terminal 110 indicates whether it wants an immediate return of the AID list by setting a suitable parameter in the initial communications protocol corresponding to operation 164 (this is feasible with a USB link between the terminal and the card, but not necessarily with all other communications protocols).

Once the terminal 110 has received the canonically ordered AID list (780), the processing of FIG. 7D continues with the terminal selecting a desired application (782) (various approaches for the terminal to make this selection are discussed in more detail below). The terminal now responds back to the card by transmitting a Select command (784). However, rather than specifying the selected application in terms of its AID, as in the conventional Select command of ISO/IEC 7816-4, the terminal instead uses the index of the desired application in the canonically ordered AID list.

The card receives the request to select by index (790) and the application corresponding to the selected index is duly launched (792). In one embodiment, operations 790 and 792 are performed by the card executive layer, such as applet selector 412, while in another embodiment, they are performed by the default application itself. In this latter case, the default application may access the canonically ordered AID list to convert the index value received from the terminal 110 into a corresponding AID value. This can then be provided to the applet selector to launch the requested application. Alternatively, in some embodiments the default application may provide the index value to applet selector, which itself is able to access the AID list (directly or indirectly) to identify and then launch the desired application.

Note that a selection by index, corresponding to the operations 782, 784, 790 and 792 (enclosed within box 795) can also be utilised following the processing of FIG. 7. In other words, after receipt of the AID list at operation 780 in FIG. 7, a selection by index value could be implemented by performing the operations shown in box 795 in FIG. 7D. It will also be appreciated that once the terminal 110 has selected the AID at step 782, it may then return the selected AID to the card at step 784 (rather than the index value of the AID).

One advantage of selecting by index is that the index value can be represented using only a single octet (byte), rather than the 16 bytes of a conventional full-length AID. (This applies for the embodiment described above where the list contains up to 256 entries, although the size of the index value is dependent on the length of the list—and vice versa). Note that a full (16-byte) AID is usually transmitted as part of a communications packet payload, whereas a single octet index value can be accommodated if desired within the command header portion of a ADPU communication.

Considering now step 782 of FIG. 7D in more detail, namely the selection by the terminal of a desired application from the canonically ordered AID list, there are a variety of mechanisms for performing this selection. For example, one possibility is that the terminal maintains a list of one or more AIDs corresponding to applications supported by the terminal. The terminal then determines the overlap between its local list and the application list received from the card, and presents the overlap set to the terminal operator (potentially the card holder) to enter a user selection of a desired, mutually supported, application. Alternatively, the selection from the overlap between the two lists may be made automatically by the terminal based on some predetermined set of one or more preferences.

Another possibility is that the terminal selects one of the applications having a predetermined index from the canonically ordered application list. In other words, the terminal may select the default application, the card holder data application, or the card management application in terms of its role. This can be done without the terminal having to know the specific AID for the application assigned the desired role, since the terminal can make its selection using the appropriate predetermined index value.

Figure 8:
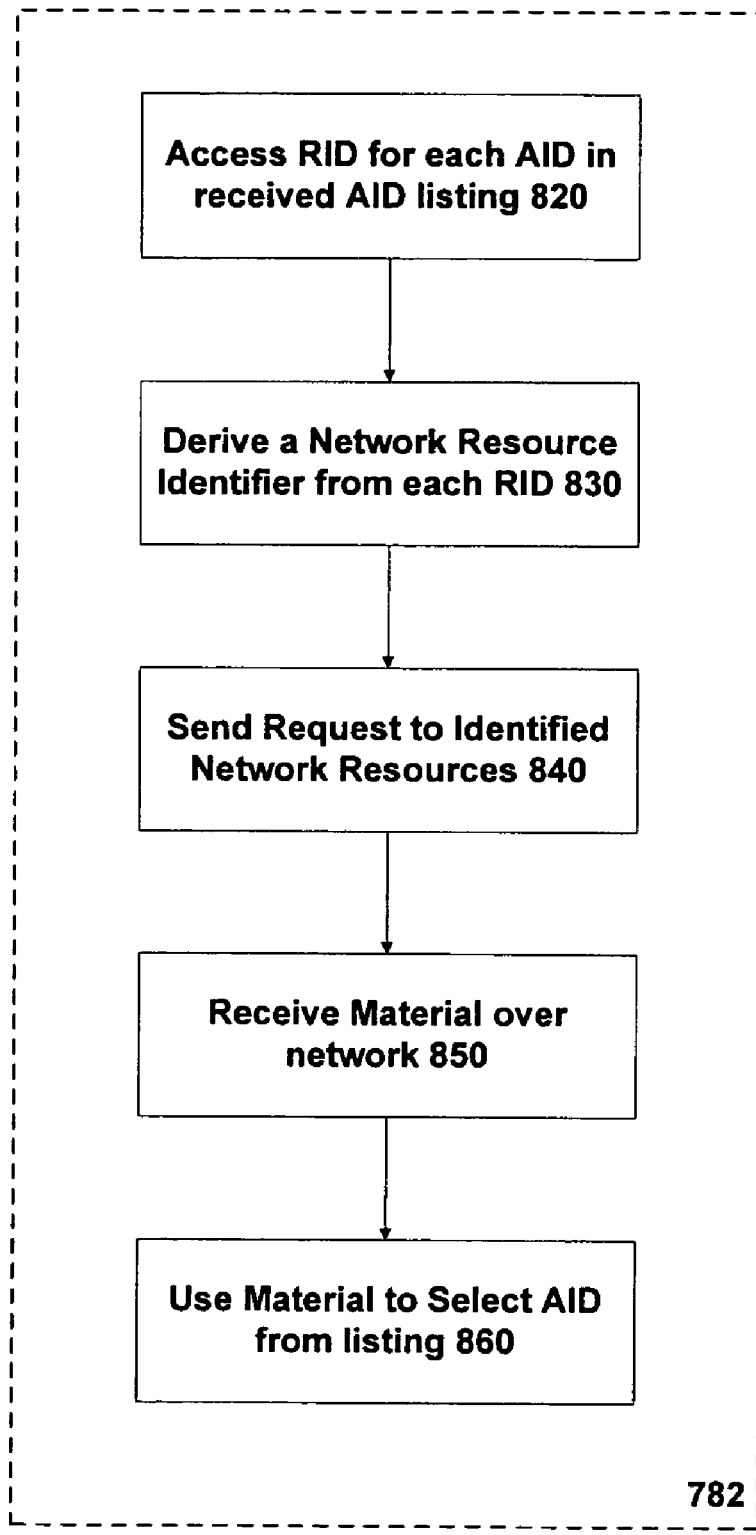
FIG. 8 illustrates a method of selecting an application from the canonically ordered AID list in accordance with one embodiment of the invention.

FIG. 8 illustrates a further approach for a terminal to select an AID from the canonically ordered AID list received from the terminal. The processing of FIG. 8 therefore provides an implementation of operation 782 from FIG. 7D in accordance with one embodiment of the invention. The method commences with the terminal extracting the RID from each AID in the canonically order AID list (820). The terminal can do this without difficulty, since the RID is defined to occupy the first five bytes of the AID by international standard ISO/IEC 7816-4:2004.

The terminal now derives a network resource identifier from the RID portion of the AID (830), and transmits a request to the identified resource (840). There are various ways in which the network resource identifier might be derived from the RID. In some cases, the terminal might support a look-up table to perform this conversion. In other cases, the terminal might send a request over a network such as the Internet specifying the URL and asking for a network resource identifier in return. In this approach, the RID may be incorporated into the URL to which the request is directed, and so can influence the response provided back to the terminal. The terminal might also send the complete AID to the remote site (rather than just the RID). Further information concerning such an approach is presented in the above-referenced application entitled: "METHOD AND APPARATUS FOR PROCESSING AN APPLICATION IDENTIFIER FROM A SMART CARD" (Sun P9179—U.S. application Ser. No. 10/786,312).

In due course after operation 840, the terminal receives back material over the network (850), either directly from the network resource itself, or possibly after some degree of redirection and/or repeated message exchange. In one embodiment, the downloaded material includes an proxy AID interpreter 811 (see FIG. 4), which is then used for further processing of one or more AIDs from the AID list. For example, the proxy AID interpreter 811 may be able to access a current balance encoded within the AID of a card.

Using the material received from the network, a selection is made of an AID from the list (860). The selected AID is then notified to the card, such as in terms of its index value within the canonically ordered list (operation 784, see FIG. 7D).

It will be appreciated that the default application on a card 102 plays a significant role in the selection by index described above. Although some existing smart cards utilise a default application to receive incoming communications after power-on, the properties and functionality generally expected of a default application are not well-determined for existing cards. In many cards, the card executive layer itself performs much of the processing associated with a default application, such as being responsible for initial communications with the terminal, and launching the selected application.

In accordance with one embodiment of the present invention, a specific interface is defined (such as in the Java programming language), and an applet must support this interface in order to qualify as a default application. The interface enables functionality that allows the application to fulfil its role as a default application. Note that the interface primarily allows the default application to interact with the card executive layer, for example by making calls to an API in the card executive layer. The interface may be empty—in other words it provides internal (private) methods for use by the default application, but does not expose any external (public) methods for use by other objects.

In accordance with one embodiment of the invention, the interface of a default application allows it to obtain the AID list from the applet selector or other source in the card executive layer (corresponding to operation 776 in FIG. 7) for supply back to a terminal. A standard method, such as GetAppList, may be provided via the interface to support such functionality. Depending upon the particular implementation, this command may be performed automatically on start-up (as in FIG. 7D), or only upon a specific request from the terminal (as in FIG. 7).

In one embodiment, the card management application also has access to the canonically ordered AID list, in general via the same mechanism (e.g. a call into the applet selector) as the default application. This then provides the card management application with knowledge of which applications that are installed on the card. In addition, it also allows the card management application to control which application takes the role of default application. For example, if a newly loaded application requests to become the default application, or if there is a request for an already installed application to become the default application (assuming that it does not already have this role), then the card management application can determine which application (if any) is currently marked as default application, and whether it is then prepared to relinquish the role. It will be appreciated that appropriate security checking and authorisation may be required before the card management application allows an application to become the (new) default application.

Note that in some situations, the card management application may itself represent the default application. In these circumstances, the card management application may not support the default application interface per se, in that analogous functionality (e.g. access to the canonically ordered application list) is already available to the card management application by virtue of its role as the card management application.

Figure 9:
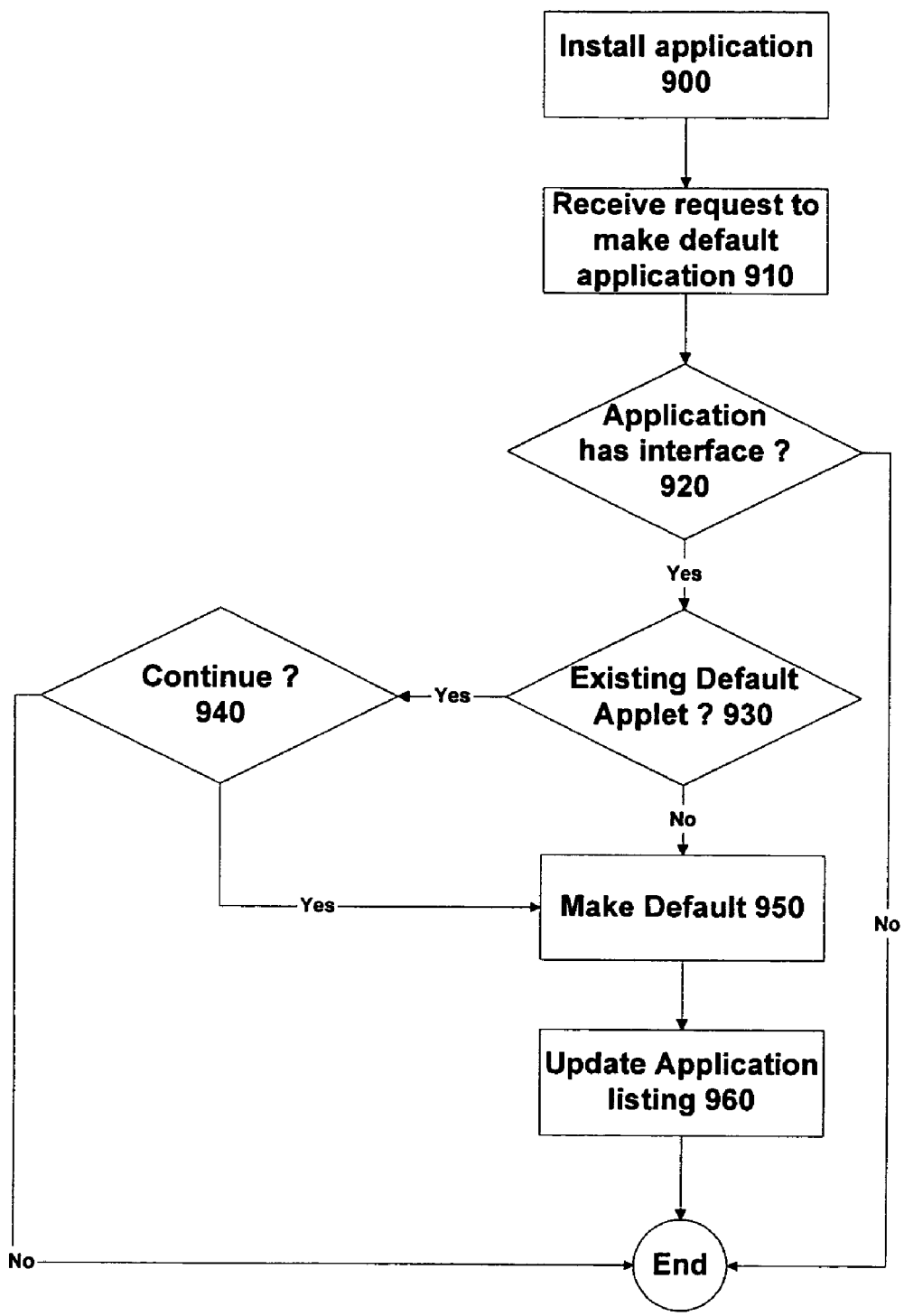
FIG. 9 illustrates a procedure for making an application the default application at install time in accordance with one embodiment of the invention.

FIG. 9 illustrates a procedure to designate an applet as the default application at load time. Processing starts with the applet being installed onto the smart card (900, corresponding to operation 215 or possibly 235 in FIG. 1). The card management application now receives a request from the installer to make the new application the default application (910). Before implementing this request, the card management application confirms whether or not the new application declares the interface specified for supporting the role of a default application (920). It will be appreciated that this check only looks for the external manifestation of the interface and confirms that the interface is not empty, rather than verifying the internal coding to implement the interface. If the newly installed applet does not declare the relevant interface, then it cannot become the default application, and so processing terminates.

Providing that the newly installed application does indeed support the interface, then a further check is made to see if there is already an existing default application (930). One way to implement this check is to look at the application listing 323 (see FIG. 4). If there is an existing default application on the card already, a decision must be made as to whether the newly installed applet should supplant the existing application in the role of default application (940), at least for some specific communications mode (if different default applications are to be specified for different communications modes).

There are various criteria that can be used for such a decision at operation 940. In some embodiments, preference may always be given to the existing default application; in other embodiments preference may always be given to the newly installed application. In some embodiments, the card management application may ask the existing default application whether it is prepared to relinquish its role. In some embodiments, the card management application may supplant the existing default application with the new one if the existing and new applications share the same RID. In some embodiments, the card management application may supplant the existing default application with the new one based on receipt of some suitable authorisation from the installer. The skilled person will be aware of various other criteria that could be used in making decision 940.

If an existing default application is to retain its role, processing terminates. Alternatively, if the newly installed application is to become default application, then the card management application performs the operations needed to give effect to this outcome (950), as discussed in more detail below. In addition, the application listing 323 (see FIG. 4) is updated (960) to reflect the assignment of a new default application.

Figure 10:
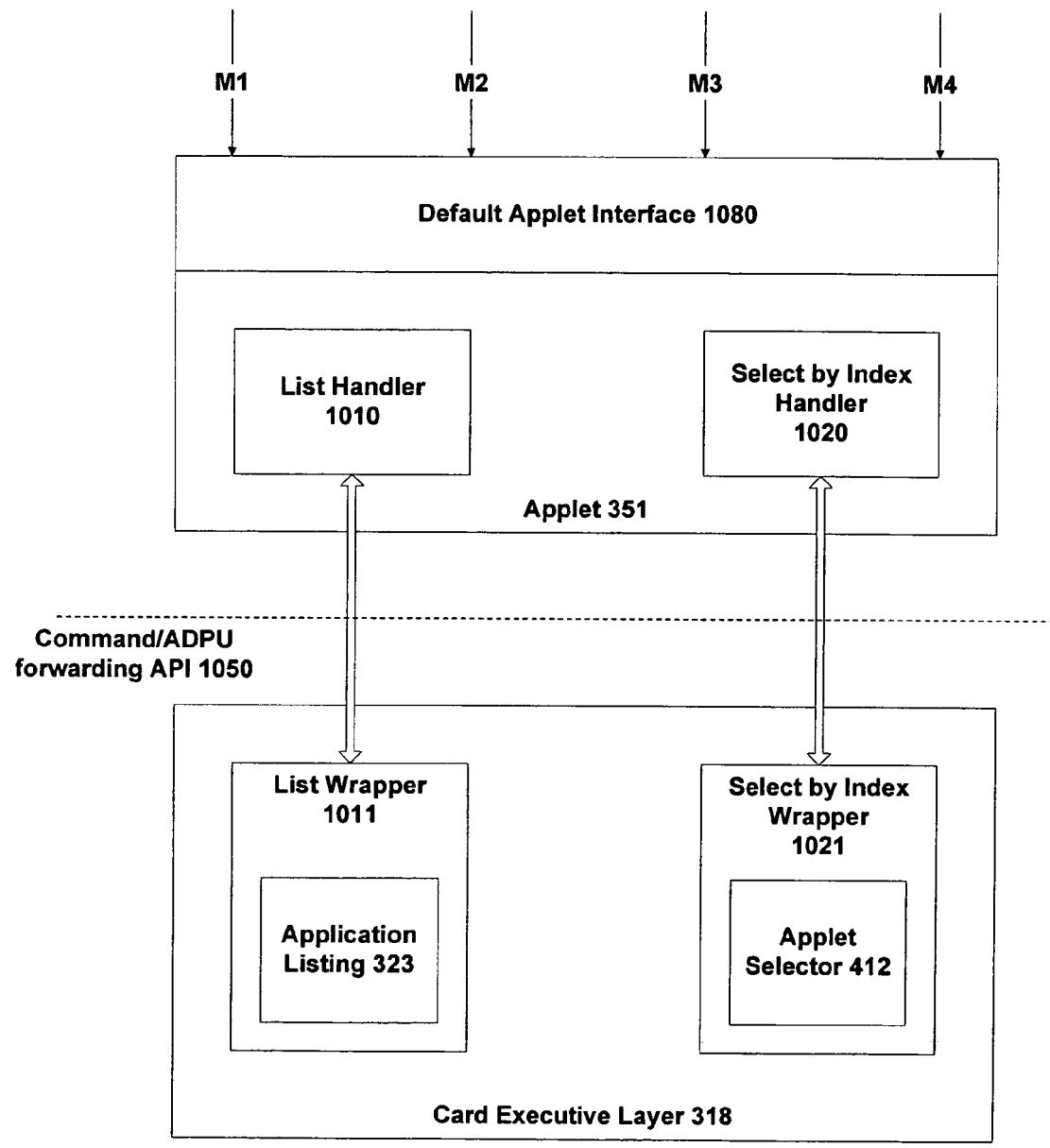
FIG. 10 is a schematic diagram showing the operation of a default application in accordance with one embodiment of the invention.

FIG. 10 is a schematic diagram illustrating an applet 351 serving as the default application on a smart card in accordance with one embodiment of the invention. The applet interacts with the card executive layer 318 via a command/ADPU forwarding API 1050. In addition, the applet supports the default application interface 1080, which in the embodiment illustrated comprises four method calls, marked as M1, M2, M3, and M4. In one embodiment, these four method calls provide the following functionality:

M1: this notifies the applet 351 that it has become the default application;

M2: this notifies the applet 351 that it is no longer the default application. Note that in some embodiments, this call might be conditional, for example on the applet 351 granting approval, such as discussed in relation to operation 940 of FIG. 9;

M3: this is used to install a list handler 1010 into applet 351. In one embodiment, this is implemented by forming a link or pointer from the list handler 1010 to a list wrapper 1011 in the card executive layer 318, which in turn controls the application listing 323. The list handler 1010 (when installed) is used by applet 351 to acquire the canonically ordered AID list from card executive layer 318 (i.e. corresponding to operation 776/776C), which can then be supplied to the terminal (operation 779, 779D), such as shown in FIGS. 7 and 7D.

M4: this is used to install a select by index handler 1020 into applet 351. In one embodiment, this is implemented by forming a link or pointer from the select by index handler 1020 to a select by index wrapper 1021, which in turn interacts with the applet selector 412. The select by index handler 1020 (when installed) is used by applet 351 to specify an application to launch on the smart card in terms of its index value in the canonically ordered AID list (i.e. corresponding to step 792 in FIG. 7D).

In one embodiment, methods M1, M3, and M4 are called by the card management application either when the applet is first installed onto a smart card, or else later when it becomes the default application (if this is after installation, or example, at run-time). The card management application then calls M2 when (if) the application ceases to be the default application.

The skilled person will be aware of various modifications to the particular embodiment shown in FIG. 10. One possibility is that the default application interface supports more or fewer calls than illustrated, and these may implement somewhat different functionality from that described above for M1–M4. For example, some embodiments may not support calls M1 and M2. In these embodiments, an applet is not formally notified that it has become (or ceased to be) the default application. (This does not prevent the applet performing the role of default application, assuming that it is launched at the appropriate time during card activation).

In some embodiments, the list handler 1010 interacts directly with the application listing 323, thereby obviating the need for wrapper 1011. Similarly, the select by index handler 1020 may interact directly with the applet selector, thereby obviating the need for wrapper 1021. This is particularly appropriate where application listing 323 directly implements the canonically ordered AID list itself.

One embodiment of the invention described herein is provided as a computer program product, which may comprise program instructions stored on a removable storage medium, for example an optical (CD ROM, DVD, etc), semiconductor (e.g. flash memory) or magnetic (floppy disk, tape, etc) device. Such a medium can then be introduced into a computer system, such as a server, a client, a smart card, etc., in order to transfer the program instructions to the system. Alternatively, the program instructions may be transferred to the computer system by download via a transmission signal medium over a network, for example, a local area network (LAN), the Internet, and so on. The transferred program instructions are often stored on a hard disk or other non-volatile storage of a computer system, and loaded for use into random access memory (RAM) for execution by a system processor.

In conclusion, although a variety of particular embodiments have been described in detail herein, it will be appreciated that this is by way of exemplification only. Accordingly, the skilled person will be aware of many further potential modifications and adaptations that fall within the scope of the claimed invention and its equivalents.

The invention claimed is:

1. A smart card having multiple applications installed thereon, wherein one of said multiple applications is designated as a default application which is activated whenever the card is reset, and wherein said default application is required to implement a first operation to provide a canonically ordered list of said multiple applications on the card.

2. The smart card of claim 1, wherein said default application is further required to implement a second operation to allow one of said multiple applications to be selected for activation via an index into said list.

3. The smart card of claim 1, wherein said default application has a programming interface to enable said first operation.

4. The smart card of claim 3, wherein said programming interface comprises a predetermined set of one or more method calls.

5. The smart card of claim 4, wherein said programming interface comprises at least a first method call for enabling the first operation and a second method call for enabling a second operation to allow one of said multiple applications to be selected for activation via an index into said list.

6. The smart card of claim 4, wherein said interface further comprises a method for notifying an application that it has been designated as the default application.

7. The smart card of claim 4, wherein said interface further comprises a method for notifying an application that it has ceased to be the default application.

8. The smart card of claim 1, wherein a handler is installed into said default application to implement the first operation to provide a canonically ordered list of said multiple applications on the card.

9. The smart card of claim 1, wherein said list is provided by the default application in response to a request from a terminal.

10. The smart card of claim 1, wherein said list is provided by a handler installed into said default application to implement the first operation to provide a canonically ordered list of said multiple applications on the card.

11. The smart card of claim 1, wherein said list is provided automatically to a terminal by the default application in response to activation of the card.

12. The smart card of claim 1, wherein said default application is configurable as to whether said list is provided by the default application to a terminal in response to a request from the terminal or automatically in response to activation of the card.

13. The smart card of claim 1, wherein an application is selected for activation by providing an index into said list in a command header of an application protocol data unit received by the card from a terminal.

14. The smart card of claim 1, further comprising a card executive layer, wherein the default application interacts with the card executive layer in order to implement the first operation.

15. The smart card of claim 14, wherein the default application obtains said list from the card executive layer.

16. The smart card of claim 1, further comprising a card executive layer, and wherein the default application interacts with the card executive layer in order to implement a second operation to allow one of said multiple applications to be selected for activation via an index into said list.

17. The smart card of claim 1, further comprising a card management application, said card management application being responsive to implement a request to make an application the default application.

18. The smart card of claim 17, wherein said request is made when the application to be made the default application is being installed onto the smart card.

19. The smart card of claim 18, wherein the card management application verifies that the application to be made the default application implements a predetermined interface.

20. The smart card of claim 19, wherein said predetermined interface is defined to support at least said first operation.

21. The smart card of claim 17, wherein said request to make an application the default application is in respect of one or more selected modes of communication.

22. The smart card of claim 17, wherein the card management application implements the request to make an application the default application by updating a pointer or marker associated with the canonically ordered list of said multiple applications on the card.

23. A method of operating a smart card having multiple applications installed thereon, comprising:
    designating one of said multiple applications as a default application, wherein said default application is required to implement a first operation to provide a canonically ordered list of said multiple applications on the card; and
    activating the default application whenever the card is reset.

24. The method of claim 23, wherein said default application is further required to implement a second operation to allow one of said multiple applications to be selected for activation via an index into said list.

25. The method of claim 23, wherein said default application has a programming interface to enable said first operation.

26. The method of claim 25, wherein said programming interface comprises a predetermined set of one or more method calls.

27. The method of claim 26, wherein said programming interface comprises at least a first method call for enabling the first operation and a second method call for enabling a second operation to allow one of said multiple applications to be selected for activation via an index into said list.

28. The method of claim 26, wherein said interface further comprises a method for notifying an application that it has been designated as the default application.

29. The method of claim 26, wherein said interface further comprises a method for notifying an application that it has ceased to be the default application.

30. The method of claim 23, further comprising installing a handler into said default application to implement the first operation to provide a canonically ordered list of said multiple applications on the card.

31. The method of claim 23, further comprising the default application providing said list in response to a request from a terminal.

32. The method of claim 23, wherein said list is provided by a handler installed into said default application to implement the first operation to provide a canonically ordered list of said multiple applications on the card.

33. The method of claim 23, further comprising the default application providing said list automatically to a terminal in response to activation of the card.

34. The method of claim 23, wherein said default application is configurable as to whether said list is provided by the default application to a terminal in response to a request from the terminal or automatically in response to activation of the card.

35. The method of claim 23, further comprising selecting an application for activation by providing an index into said list in a command header of an application protocol data unit received by the card from a terminal.

36. The method of claim 23, further comprising the default application interacting with a card executive layer in order to implement the first operation.

37. The method of claim 36, wherein the default application obtains said list from the card executive layer.

38. The method of claim 23, further comprising the default application interacting with a card executive layer in order to implement a second operation to allow one of said multiple applications to be selected for activation via an index into said list.

39. The method of claim 38, further comprising a card management application responding to a request to make an application the default application.

40. The method of claim 39, wherein said request is made when the application to be made the default application is being installed onto the smart card.

41. The method of claim 40, further comprising the card management application verifying that the application to be made the default application implements a predetermined interface.

42. The method of claim 41, wherein said predetermined interface is defined to support at least said first operation.

43. The method of claim 39, wherein said request to make an application the default application is in respect of one or more selected modes of communication.

44. The method of claim 39, further comprising the card management application implementing the request to make an application the default application by updating a pointer or marker associated with the canonically ordered list of said multiple applications on the card.

45. Means for operating a smart card having multiple applications installed thereon, comprising:
means for designating one of said multiple applications as a default application, wherein said default application is required to implement a first operation to provide a canonically ordered list of said multiple applications on the card; and
means for activating the default application whenever the card is reset.

46. A method of designating an application on a smart card as a default application, comprising:
receiving a request to designate an application as a default application on the smart card;
confirming that said default application implements a first operation to provide a canonically ordered listing of multiple applications on the card; and
designating the requested application as the default application, subject to a positive outcome from the confirming.

47. Means for designating an application on a smart card as a default application, comprising:
means for receiving a request to designate an application as a default application on the smart card;
means for confirming that said default application implements a first operation to provide a canonically ordered listing of multiple applications on the card; and
means for designating the requested application as the default application, subject to a positive outcome from the confirming means.

48. A computer program product comprising an application having program instructions on a medium, said application being operable on a smart card having multiple applications installed thereon to:
function as a default application, wherein said default application is activated whenever the card is reset: and
implement a first operation to provide a canonically ordered list of multiple applications on the card.

49. The computer program product of claim 48, wherein said default application is further operable to implement a second operation to allow one of said multiple applications to be selected for activation via an index into said list.

50. The computer program product of claim 48, wherein said default application has a programming interface to enable said first operation.

51. The computer program product of claim 50, wherein said programming interface comprises a predetermined set of one or more method calls.

52. The computer program product of claim 51, wherein said programming interface comprises at least a first method call for enabling the first operation and a second method call for enabling a second operation to allow one of said multiple applications to be selected for activation via an index into said list.

53. The computer program product of claim 51, wherein said interface further comprises a method for notifying an application that it has been designated as the default application.

54. The computer program product of claim 51, wherein said interface further comprises a method for notifying an application that it has ceased to be the default application.

55. The computer program product of claim 48, wherein a handler is installed into said default application to implement the first operation to provide a canonically ordered list of said multiple applications on the card.

56. The computer program product of claim 48, wherein said list is provided by the default application in response to a request from a terminal.

57. The computer program product of claim 48, wherein said list is provided by a handler installed into said default application to implement the first operation to provide a canonically ordered list of said multiple applications on the card.

58. The computer program product of claim 48, wherein said list is provided automatically to a terminal by the default application in response to activation of the card.

59. The computer program product of claim 48, wherein said default application is configurable as to whether said list is provided by the default application to a terminal in response to a request from the terminal or automatically in response to activation of the card.

60. The computer program product of claim 48, wherein an application is selected for activation by providing an index into said list in a command header of an application protocol data unit received by the card from a terminal.

61. The computer program product of claim 48, wherein the default application is further operable to interact with a card executive layer in order to implement the first operation.

62. The computer program product of claim 61, wherein the default application is operable to obtain said list from the card executive layer.

63. The computer program product of claim 48, wherein the default application is further operable to interact with the card executive layer in order to implement a second operation to allow one of said multiple applications to be selected for activation via an index into said list.

64. The computer program product of claim 48, further comprising a card management application, said card management application being responsive to implement a request to make an application the default application.

65. A computer program product comprising a card management application having program instructions on a medium, said application being operable on a smart card to:
receive a request for an application to become the default application; and
verify that the application supports a first operation to provide a canonically ordered list of multiple applications on the card, wherein the application is allowed to become the default application only if it supports said first operation.

66. The computer program product of claim 65, wherein said request is made when the application to be made the default application is being installed onto the smart card.

67. The computer program product of claim 66, wherein said request to make an application the default application is in respect of one or more selected modes of communication.

68. The computer program product of claim 65, wherein the card management application is further operable to implement the request to make an application the default application by updating a pointer or marker associated with said canonically ordered list.

69. A data structure for smart card having multiple applications installed thereon, wherein one of said multiple applications is designated as a default application which is activated whenever the card is reset, said data structure comprising a canonically ordered list of said multiple applications on the card, and further comprising an indication of which of said multiple applications is designated as the default application, wherein said default application is required to implement a first operation to provide a canonically ordered list of said multiple applications on the card.

* * * * *